United States Patent
Somekh et al.

(10) Patent No.: US 9,348,924 B2
(45) Date of Patent: May 24, 2016

(54) ALMOST ONLINE LARGE SCALE COLLABORATIVE FILTERING BASED RECOMMENDATION SYSTEM

(71) Applicant: Yahoo! Inc., Sunnyvale, CA (US)

(72) Inventors: Oren Shlomo Somekh, Bet-Yehoshua (IL); Nadav Golbandi, Haifa (IL); Oleg Rokhlenko, Haifa (IL); Ronny Lempel, Zichron Yaakov (IL)

(73) Assignee: YAHOO! INC., Sunnyvale, CA (US)

( * ) Notice: Subject to any disclaimer, the term of this patent is extended or adjusted under 35 U.S.C. 154(b) by 227 days.

(21) Appl. No.: 14/123,321

(22) PCT Filed: Mar. 15, 2013

(86) PCT No.: PCT/US2013/032416
§ 371 (c)(1),
(2) Date: Dec. 2, 2013

(87) PCT Pub. No.: WO2014/143024
PCT Pub. Date: Sep. 18, 2014

(65) Prior Publication Data
US 2014/0280251 A1    Sep. 18, 2014

(51) Int. Cl.
*G06F 17/30*    (2006.01)
*G06Q 30/02*    (2012.01)

(52) U.S. Cl.
CPC ...... *G06F 17/30867* (2013.01); *G06Q 30/0269* (2013.01)

(58) Field of Classification Search
CPC .................. G06F 17/30867; G06Q 30/0269
See application file for complete search history.

(56) References Cited

U.S. PATENT DOCUMENTS

| | | | |
|---|---|---|---|
| 6,850,252 B1* | 2/2005 | Hoffberg | G06K 9/00369 348/E7.061 |
| 7,644,427 B1* | 1/2010 | Horvitz | H04H 60/37 725/13 |
| 8,082,511 B2* | 12/2011 | Sobotka | G06F 3/0482 715/745 |
| 8,352,319 B2 | 1/2013 | Wang et al. | |
| 2007/0156677 A1* | 7/2007 | Szabo | G06F 17/30522 |
| 2008/0126176 A1* | 5/2008 | Iguchi | G06Q 30/0201 705/7.29 |
| 2008/0222132 A1 | 9/2008 | Pan et al. | |

(Continued)

FOREIGN PATENT DOCUMENTS

WO    2008106548 A2    9/2008

OTHER PUBLICATIONS

Koren, Yehuda. Collaborative filtering with temporal dynamics. 2010. Communications of the ACM. vol. 53, Issue 4. pp. 89-97.*
International Search Report (PCT/ISA/210) issued on Dec. 10, 2013, by Korean Intellectual Property Office as the International Searching Authority for International Application No. PCT/US2013/032416.

(Continued)

*Primary Examiner* — James E Richardson
(74) *Attorney, Agent, or Firm* — Pillsbury Winthrop Shaw Pittman LLP

(57) ABSTRACT

A method for adjusting one or more parameters associated with a model. The method comprises obtaining, from a first source, first information related to activity of a user. The method further comprises adjusting one or more parameters associated with a model based on the first information collected within a first length of time, and obtaining, from a second source, second information related to activity of the user. The method further comprises adjusting the one or more parameters associated with the model based on the second information collected within a second length of time and a measure indicative of performance of the model, wherein the second length of time is larger than the first length of time.

18 Claims, 20 Drawing Sheets

(56) References Cited

U.S. PATENT DOCUMENTS

2009/0222316 A1* 9/2009 Boinepalli ............ G06Q 10/00
 705/7.33
2011/0153663 A1* 6/2011 Koren ............... G06F 17/30964
 707/776
2011/0161331 A1 6/2011 Chung et al.

OTHER PUBLICATIONS

Billsus, Daniel et al., "A Hybrid User Model for News Story Classification," In: Proceedings of the 7th International Conference on User Modeling, Springer-Verlag, pp. 99-108, 1999.

International Preliminary Report on Patentability issued Sep. 15, 2015 in International Application No. PCT/US2013/032416.

* cited by examiner

ALMOST ONLINE LARGE SCALE COLLABORATIVE FILTERING BASED RECOMMENDATION SYSTEM

CROSS-REFERENCE TO RELATED APPLICATIONS

This application is a National Stage of PCT/US2013/032416, filed Mar. 15, 2013, and designating the United States, hereby expressly incorporated by reference in its entirety.

BACKGROUND

1. Technical Field

The present teaching relates to methods and systems for providing content. Specifically, the present teaching relates to methods and systems for providing online content.

2. Discussion of Technical Background

The Internet has made it possible for a user to electronically access virtually any content at anytime and from any location. With the explosion of information, it has become more and more important to provide users with information that is relevant to the user and not just information in general. Further, as users of today's society rely on the Internet as their source of information, entertainment, and/or social connections, e.g., news, social interaction, movies, music, etc, it is critical to provide users with information they find valuable.

Efforts have been made to attempt to allow users to readily access relevant and on the point content. For example, topical portals have been developed that are more subject matter oriented as compared to generic content gathering systems such as traditional search engines. Example topical portals include portals on finance, sports, news, weather, shopping, music, art, film, etc. . . . . Such topical portals allow users to access information related to subject matters that these portals are directed to. Users have to go to different portals to access content of certain subject matter, which is not convenient and not user centric.

Another line of efforts in attempting to enable users to easily access relevant content is via personalization, which aims at understanding each user's individual likings/interests/preferences so that an individualized user profile for each user can be set up and can be used to select content that matches a user's interests. The underlying goal is to meet the minds of users in terms of content consumption. User profiles traditionally are constructed based on users' declared interests and/or inferred from, e.g., users' demographics. There have also been systems that identify users' interests based on observations made on users' interactions with content. A typical example of such user interaction with content is click through rate (CTR).

These traditional approaches have various shortcomings. For example, users' interests are profiled without any reference to a baseline so that the level of interest can be more accurately estimated. User interests are detected in isolated application settings so that user profiling in individual applications cannot capture a broad range of the overall interests of a user. Such traditional approach to user profiling lead to fragmented representation of user interests without a coherent understanding of the users' preferences. Because profiles of the same user derived from different application settings are often grounded with respect to the specifics of the applications, it is also difficult to integrate them to generate a more coherent profile that better represent the user's interests.

User activities directed to content are traditionally observed and used to estimate or infer users' interests. CTR is the most commonly used measure to estimate users' interests. However, CTR is no longer adequate to capture users' interests particularly given that different types of activities that a user may perform on different types of devices may also reflect or implicate user's interests. In addition, user reactions to content usually represent users' short term interests. Such observed short term interests, when acquired piece meal, as traditional approaches often do, can only lead to reactive, rather than proactive, services to users. Although short term interests are important, they are not adequate to enable understanding of the more persistent long term interests of a user, which are crucial in terms of user retention. Most user interactions with content represent short term interests of the user so that relying on such short term interest behavior makes it difficult to expand the understanding of the increasing range of interests of the user. When this is in combination with the fact that such collected data is always the past behavior and collected passively, it creates a personalization bubble, making it difficult, if not impossible, to discover other interests of a user unless the user initiates some action to reveal new interests.

Yet another line of effort to allow users to access relevant content is to pooling content that may be interested by users in accordance with their interests. Given the explosion of information on the Internet, it is not likely, even if possible, to evaluate all content accessible via the Internet whenever there is a need to select content relevant to a particular user. Thus, realistically, it is needed to identify a subset or a pool of the Internet content based on some criteria so that content can be selected from this pool and recommended to users based on their interests for consumption.

Conventional approaches to creating such a subset of content are application centric. Each application carves out its own subset of content in a manner that is specific to the application. For example, Amazon.com may have a content pool related to products and information associated thereof created/updated based on information related to its own users and/or interests of such users exhibited when they interact with Amazon.com. Facebook also has its own subset of content, generated in a manner not only specific to Facebook but also based on user interests exhibited while they are active on Facebook. As a user may be active in different applications (e.g., Amazon.com and Facebook) and with each application, they likely exhibit only part of their overall interests in connection with the nature of the application. Given that, each application can usually gain understanding, at best, of partial interests of users, making it difficult to develop a subset of content that can be used to serve a broader range of users' interests.

Another line of effort is directed to personalized content recommendation, i.e., selecting content from a content pool based on the user's personalized profiles and recommending such identified content to the user. Conventional solutions focus on relevance, i.e., the relevance between the content and the user. Although relevance is important, there are other factors that also impact how recommendation content should be selected in order to satisfy a user's interests. Most content recommendation systems insert advertisement to content identified for a user for recommendation. Some traditional systems that are used to identify insertion advertisements match content with advertisement or user's query (also content) with advertisement, without considering matching based on demographics of the user with features of the target audience defined by advertisers. Some traditional systems match user profiles with the specified demographics of the target audience defined by advertisers but without matching the content to be provided to the user and the advertisement.

The reason is that content is often classified into taxonomy based on subject matters covered in the content yet advertisement taxonomy is often based on desired target audience groups. This makes it less effective in terms of selecting the most relevant advertisement to be inserted into content to be recommended to a specific user.

There is a need for improvements over the conventional approaches to personalizing content recommendation.

SUMMARY

The teachings disclosed herein relate to methods, systems, and programming for providing personalized web page layouts.

In one embodiment, a method is provided for adjusting one or more parameters associated with a model. The method comprises obtaining, from a first source, first information related to activity of a user. The method further comprises adjusting one or more parameters associated with a model based on the first information collected within a first length of time, and obtaining, from a second source, second information related to activity of the user. The method further comprises adjusting the one or more parameters associated with the model based on the second information collected within a second length of time and a measure indicative of performance of the model, wherein the second length of time is larger than the first length of time.

In another embodiment, a system for adjusting one or more parameters associated with a model is provided. The system comprises a modeling enhancer unit configured to obtain, from a first source, first information related to activity of a user, the modeling enhancer unit further configured to obtain, from a second source, second information related to activity of the user, The system further comprises a first adjuster unit configured to adjust one or more parameters associated with a model based on the first information collected within a first length of time, and a second adjuster unit configured to adjust the one or more parameters associated with the model based on the second information collected within a second length of time and a measure indicative of performance of the model, wherein the second length of time is larger than the first length of time.

In yet another embodiment, a non-transitory computer readable medium is provided having recorded thereon information for adjusting one or more parameters associated with a model, wherein the information, when read by a computer, causes the computer to perform the steps of obtaining, from a first source, first information related to activity of a user, adjusting one or more parameters associated with a model based on the first information collected within a first length of time, obtaining, from a second source, second information related to activity of the user, adjusting the one or more parameters associated with the model based on the second information collected within a second length of time and a measure indicative of performance of the model, wherein the second length of time is larger than the first length of time.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
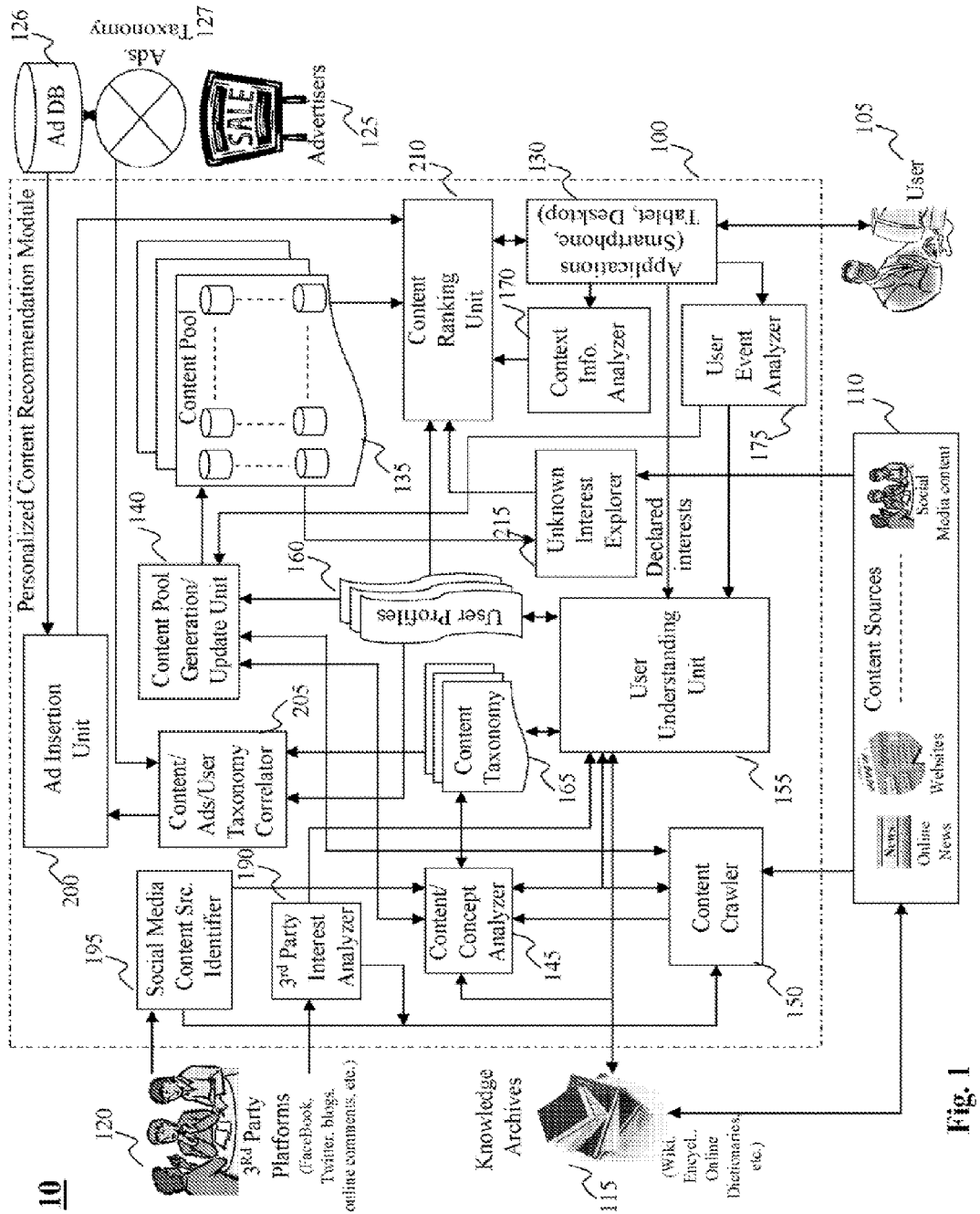
FIG. 1 depicts an exemplary system diagram for personalized content recommendation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to personalizing on-line content recommendations to a user. Particularly, the present teaching relates to a system, method, and/or programs for personalized content recommendation that addresses the shortcomings associated the conventional content recommendation solutions in personalization, content pooling, and recommending personalized content.

With regard to personalization, the present teaching identifies a user's interests with respect to a universal interest space, defined via known concept archives such as Wikipedia and/or content taxonomy. Using such a universal interest space, interests of users, exhibited in different applications and via different platforms, can be used to establish a general population's profile as a baseline against which individual user's interests and levels thereof can be determined. For example, users active in a third party application such as Facebook or Twitter and the interests that such users exhibited in these third party applications can be all mapped to the universal interest space and then used to compute a baseline interest profile of the general population. Specifically, each user's interests observed with respect to each document covering certain subject matters or concepts can be mapped to, e.g., Wikipedia or certain content taxonomy. A high dimensional vector can be constructed based on the universal interest space in which each attribute of the vector corresponds to a concept in the universal space and the value of the attribute may corresponds to an evaluation of the user's interest in this particular concept. The general baseline interest profile can be derived based on all vectors represent the population. Each vector representing an individual can be normalized against the baseline interest profile so that the relative level of interests of the user with respect to the concepts in the universal interest space can be determined. This enables better understanding of the level of interests of the user in different subject matters with respect to a more general population and result in enhanced personalization for content recommendation. Rather than characterizing users' interests merely according to proprietary content taxonomy, as is often done in the prior art, the present teaching leverages public concept archives, such as Wikipedia or online encyclopedia, to define a universal interest space in order to profile a user's interests in a more coherent manner. Such a high dimensional vector captures the entire interest space of every user, making person-to-person comparison as to personal interests more effective. Profiling a user and in this manner also leads to efficient identification of users who share similar interests. In addition, content may also be characterized in the same universal interest space, e.g., a high dimensional vector against the concepts in the universal interest space can also be constructed with values in the vector indicating whether the content covers each of the concepts in the universal interest space. By characterizing users and content in the same space in a coherent way, the affinity between a user and a piece of content can be determined via, e.g., a dot product of the vector for the user and the vector for the content.

The present teaching also leverages short term interests to better understand long term interests of users. Short term interests can be observed via user online activities and used in online content recommendation, the more persistent long term interests of a user can help to improve content recommendation quality in a more robust manner and, hence, user retention rate. The present teaching discloses discovery of long term interests as well as short term interests.

To improve personalization, the present teaching also discloses ways to improve the ability to estimate a user's interest based on a variety of user activities. This is especially useful because meaningful user activities often occur in different settings, on different devices, and in different operation modes. Through such different user activities, user engagement to content can be measured to infer users' interests. Traditionally, clicks and click through rate (CTR) have been used to estimate users' intent and infer users' interests. CTR is simply not adequate in today's world. Users may dwell on a certain portion of the content, the dwelling may be for different lengths of time, users may scroll along the content and may dwell on a specific portion of the content for some length of time, users may scroll down at different speeds, users may change such speed near certain portions of content, users may skip certain portion of content, etc. All such activities may have implications as to users' engagement to content. Such engagement can be utilized to infer or estimate a user's interests. The present teaching leverages a variety of user activities that may occur across different device types in different settings to achieve better estimation of users' engagement in order to enhance the ability of capturing a user's interests in a more reliable manner.

Another aspect of the present teaching with regard to personalization is its ability to explore unknown interests of a user by generating probing content. Traditionally, user profiling is based on either user provided information (e.g., declared interests) or passively observed past information such as the content that the user has viewed, reactions to such content, etc. Such prior art schemes can lead to a personalization bubble where only interests that the user revealed can be used for content recommendation. Because of that, the only user activities that can be observed are directed to such known interests, impeding the ability to understand the overall interest of a user. This is especially so considering the fact that users often exhibit different interests (mostly partial interests) in different application settings. The present teaching discloses ways to generate probing content with concepts that is currently not recognized as one of the user's interests in order to explore the user's unknown interests. Such probing content is selected and recommended to the user and user activities directed to the probing content can then be analyzed to estimate whether the user has other interests. The selection of such probing content may be based on a user's current known interests by, e.g., extrapolating the user's current interests. For example, for some known interests of the user (e.g., the short term interests at the moment), some probing concepts in the universal interest space, for which the user has not exhibited interests in the past, may be selected according to some criteria (e.g., within a certain distance from the user's current known interest in a taxonomy tree) and content related to such probing concepts may then be selected and recommended to the user. Another way to identify probing concept (corresponding to unknown interest of the user) may be through the user's cohorts. For instance, a user may share certain interests with his/her cohorts but some members of the circle may have some interests that the user has never exhibited before. Such un-shared interests with cohorts may be selected as probing unknown interests for the user and content related to such probing unknown interests may then be selected as probing content to be recommended to the user. In this manner, the present teaching discloses a scheme by which a user's interests can be continually probed and understood to improve the quality of personalization. Such managed probing can also be combined with random selection of probing content to allow discovery of unknown interests of the user that are far removed from the user's current known interests.

A second aspect of recommending quality personalized content is to build a content pool with quality content that covers subject matters interesting to users. Content in the content pool can be rated in terms of the subject and/or the performance of the content itself. For example, content can be characterized in terms of concepts it discloses and such a characterization may be generated with respect to the universal interest space, e.g., defined via concept archive(s) such as content taxonomy and/or Wikipedia and/or online encyclopedia, as discussed above. For example, each piece of content can be characterized via a high dimensional vector with each attribute of the vector corresponding to a concept in the interest universe and the value of the attribute indicates whether and/or to what degree the content covers the concept. When a piece of content is characterized in the same universal interest space as that for user's profile, the affinity between the content and a user profile can be efficiently determined.

Each piece of content in the content pool can also be individually characterized in terms of other criteria. For example, performance related measures, such as popularity of the content, may be used to describe the content. Performance related characterizations of content may be used in both selecting content to be incorporated into the content pool as well as selecting content already in the content pool for recommendation of personalized content for specific users. Such performance oriented characterizations of each piece of content may change over time and can be assessed periodically and can be done based on users' activities. Content pool also changes over time based on various reasons, such as content performance, change in users' interests, etc. Dynamically changed performance characterization of content in the content pool may also be evaluated periodically or dynamically based on performance measures of the content so that the content pool can be adjusted over time, i.e., by removing low performance content pieces, adding new content with good performance, or updating content.

To grow the content pool, the present teaching discloses ways to continually discover both new content and new content sources from which interesting content may be accessed, evaluated, and incorporated into the content pool. New content may be discovered dynamically via accessing information from third party applications which users use and exhibit various interests. Examples of such third party applications include Facebook, Twitter, Microblogs, or YouTube. New content may also be added to the content pool when some new interest or an increased level of interests in some subject matter emerges or is predicted based on the occurrence of certain (spontaneous) events. One example is the content about the life of Pope Benedict, which in general may not be a topic of interests to most users but likely will be in light of the surprising announcement of Pope Benedict's resignation. Such dynamic adjustment to the content pool aims at covering a dynamic (and likely growing) range of interests of users, including those that are, e.g., exhibited by users in different settings or applications or predicted in light of context information. Such newly discovered content may then be evaluated before it can be selected to be added to the content pool.

Certain content in the content pool, e.g., journals or news, need to be updated over time. Conventional solutions usually update such content periodically based on a fixed schedule. The present teaching discloses the scheme of dynamically determining the pace of updating content in the content pool based on a variety of factors. Content update may be affected by context information. For example, the frequency at which a piece of content scheduled to be updated may be every 2 hours, but this frequency can be dynamically adjusted according to, e.g., an explosive event such as an earthquake. As another example, content from a social group on Facebook devoted to Catholicism may normally be updated daily. When Pope Benedict's resignation made the news, the content from that social group may be updated every hour so that interested users can keep track of discussions from members of this social group. In addition, whenever there are newly identified content sources, it can be scheduled to update the content pool by, e.g., crawling the content from the new sources, processing the crawled content, evaluating the crawled content, and selecting quality new content to be incorporated into the content pool. Such a dynamically updated content pool aims at growing in compatible with the dynamically changing users' interests in order to facilitate quality personalized content recommendation.

Another key to quality personalized content recommendation is the aspect of identifying quality content that meets the interests of a user for recommendation. Previous solutions often emphasize mere relevance of the content to the user when selecting content for recommendation. In addition, traditional relevance based content recommendation was mostly based on short term interests of the user. This not only leads to a content recommendation bubble, i.e., known short interests cause recommendations limited to the short term interests and reactions to such short term interests centric recommendations cycle back to the short term interests that start the process. This bubble makes it difficult to come out of the circle to recommend content that can serve not only the overall interests but also long term interests of users. The present teaching combines relevance with performance of the content so that not only relevant but also quality content can be selected and recommended to users in a multi-stage ranking system.

In addition, to identify recommended content that can serve a broad range of interests of a user, the present teaching relies on both short term and long term interests of the user to identify user-content affinity in order to select content that meets a broader range of users' interests to be recommended to the user.

In content recommendation, monetizing content such as advertisements are usually also selected as part of the recommended content to a user. Traditional approaches often select ads based on content in which the ads are to be inserted. Some traditional approaches also rely on user input such as queries to estimate what ads likely can maximize the economic return. These approaches select ads by matching the taxonomy of the query or the content retrieved based on the query with the content taxonomy of the ads. However, content taxonomy is commonly known not to correspond with advertisement taxonomy, which advertisers use to target at certain audience. As such, selecting ads based on content taxonomy does not serve to maximize the economic return of the ads to be inserted into content and recommended to users. The present teaching discloses method and system to build a linkage between content taxonomy and advertisement taxonomy so that ads that are not only relevant to a user's interests but also the interests of advertisers can be selected. In this way, the recommended content with ads to a user can both serve the user's interests and at the same time to allow the content operator to enhance monetization via ads.

Yet another aspect of personalized content recommendation of the present teaching relates to recommending probing content that is identified by extrapolating the currently known user interests. Traditional approaches rely on selecting either random content beyond the currently known user interests or content that has certain performance such as a high level of click activities. Random selection of probing content presents a low possibility to discover a user's unknown interests. Identifying probing content by choosing content for which a higher level of activities are observed is also problematic because there can be many pieces of content that a user may potentially be interested but there is a low level of activities associated therewith. The present teaching discloses ways to identify probing content by extrapolating the currently known interest with the flexibility of how far removed from the currently known interests. This approach also incorporates the mechanism to identify quality probing content so that there is an enhanced likelihood to discover a user's unknown interests. The focus of interests at any moment can be used as an anchor interest based on which probing interests (which are not known to be interests of the user) can be extrapolated from the anchor interests and probing content can be selected based on the probing interests and recommended to the user together with the content of the anchor interests. Probing interests/content may also be determined based on other considerations such as locale, time, or device type. In this way, the disclosed personalized content recommendation system can continually explore and discover unknown interests of a user to understand better the overall interests of the user in order to expand the scope of service.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 depicts an exemplary system diagram 10 for personalized content recommendation to a user 105, according to an embodiment of the present teaching. System 10 comprises a personalized content recommendation module 100, which comprises numerous sub modules, content sources 110, knowledge archives 115, third party platforms 120, and advertisers 125 with advertisement taxonomy 127 and advertisement database 126. Content sources 110 may be any source of on-line content such as on-line news, published papers, blogs, on-line tabloids, magazines, audio content, image content, and video content. It may be content from content provider such as Yahoo! Finance, Yahoo! Sports, CNN, and ESPN. It may be multi-media content or text or any other form of content comprised of website content, social media content, such as Facebook, twitter, Reddit, etc, or any other content rich provider. It may be licensed content from providers such AP and Reuters. It may also be content crawled and indexed from various sources on the Internet. Content sources 110 provide a vast array of content to the personalized content recommendation module 100 of system 10.

Knowledge archives 115 may be an on-line encyclopedia such as Wikipedia or indexing system such as an on-line dictionary. On-line concept archives 115 may be used for its content as well as its categorization or indexing systems. Knowledge archives 115 provide extensive classification system to assist with the classification of both the user's 105 preferences as well as classification of content. Knowledge concept archives, such as Wikipedia may have hundreds of thousands to millions of classifications and sub-classifications. A classification is used to show the hierarchy of the category. Classifications serve two main purposes. First they help the system understand how one category relates to another category and second, they help the system maneuver between higher levels on the hierarchy without having to move up and down the subcategories. The categories or classification structure found in knowledge archives 115 is used for multidimensional content vectors as well as multidimensional user profile vectors which are utilized by personalized content recommendation module 100 to match personalized content to a user 105. Third party platforms 120 maybe any third party applications including but not limited to social networking sites like Facebook, Twitter, LinkedIn, Google+. It may include third party mail servers such as GMail or Bing Search. Third party platforms 120 provide both a source of content as well as insight into a user's personal preferences and behaviors.

Advertisers 125 are coupled with the ad content database 126 as well as an ads classification system or ad. taxonomy 127 intended for classified advertisement content. Advertisers 125 may provide streaming content, static content, and sponsored content. Advertising content may be placed at any location on a personalized content page and may be presented both as part of a content stream as well as a standalone advertisement, placed strategically around or within the content stream.

Personalized content recommendation module 100 comprises applications 130, content pool 135, content pool generation/update unit 140, concept/content analyzer 145, content crawler 150, unknown interest explorer 215, user understanding unit 155, user profiles 160, content taxonomy 165, context information analyzer 170, user event analyzer 175, third party interest analyzer 190, social media content source identifier 195, advertisement insertion unit 200 and content/advertisement/taxonomy correlator 205. These components are connected to achieve personalization, content pooling, and recommending personalized content to a user. For example, the content ranking unit 210 works in connection with context information analyzer 170, the unknown interest explorer 215, and the ad insertion unit 200 to generate personalized content to be recommended to a user with personalized ads or probing content inserted. To achieve personalization, the user understanding unit 155 works in connection with a variety of components to dynamically and continuously update the user profiles 160, including content taxonomy 165, the knowledge archives 115, user event analyzer 175, and the third party interest analyzer 190. Various components are connected to continuously maintain a content pool, including the content pool generation/update unit 140, user event analyzer 175, social media content source identifier 195, content/concept analyzer 145, content crawler 150, the content taxonomy 165, as well as user profiles 160.

Personalized content recommendation module 100 is triggered when user 105 engages with system 10 through applications 130. Applications 130 may receive information in the form of a user id, cookies, log in information from user 105 via some form of computing device. User 105 may access system 10 via a wired or wireless device and may be stationary or mobile. User 105 may interface with the applications 130 on a tablet, a Smartphone, a laptop, a desktop or any other computing device which may be embedded in devices such as watches, eyeglasses, or vehicles. In addition to receiving insights from the user 105 about what information the user 105 might be interested, applications 130 provides information to user 105 in the form of personalized content stream. User insights might be user search terms entered to the system, declared interests, user clicks on a particular article or subject, user dwell time or scroll over of particular content, user skips with respect to some content, etc. User insights may be a user indication of a like, a share, or a forward action on a social networking site, such as Facebook, or even peripheral activities such as print or scan of certain content. All of these user insights or events are utilized by the personalized content recommendation module 100 to locate and customize content to be presented to user 105. User insights received via applications 130 are used to update personalized profiles for users which may be stored in user profiles 160. User profiles 160 may be database or a series of databases used to store personalized user information on all the users of system 10. User profiles 160 may be a flat or relational database and may be stored in one or more locations. Such user insights may also be used to determine how to dynamically update the content in the content pool 135.

A specific user event received via applications 130 is passed along to user event analyzer 175, which analyzes the user event information and feeds the analysis result with event data to the user understanding unit 155 and/or the content pool generation/update unit 140. Based on such user event information, the user understanding unit 155 estimates short term interests of the user and/or infer user's long term interests based on behaviors exhibited by user 105 over long or repetitive periods. For example, a long term interest may be a general interest in sports, where as a short term interest may be related to a unique sports event, such as the Super Bowl at a particular time. Over time, a user's long term interest may be estimated by analyzing repeated user events. A user who, during every engagement with system 10, regularly selects content related to the stock market may be considered as having a long term interest in finances. In this case, system 10 accordingly, may determine that personalized content for user 105 should contain content related to finance. Contrastingly, short term interest may be determined based on user events which may occur frequently over a short period, but which is not something the user 105 is interested in the long term. For example, a short term interest may reflect the momentary interest of a user which may be triggered by something the user saw in the content but such an interest may not persist over time. Both short and long term interest are important in terms of identifying content that meets the desire of the user 105, but need to be managed separately because of the difference in their nature as well as how they influence the user.

In some embodiments, short term interests of a user may be analyzed to predict the user's long term interests. To retain a user, it is important to understand the user's persistent or long term interests. By identifying user 105's short term interest and providing him/her with a quality personalized experience, system 10 may convert an occasional user into a long term user. Additionally, short term interest may trend into long term interest and vice versa. The user understanding unit 155 provides the capability of estimating both short and long term interests.

The user understanding unit 155 gathers user information from multiple sources, including all the user's events, and creates one or more multidimensional personalization vectors. In some embodiments, the user understanding unit 155 receives inferred characteristics about the user 105 based on the user events, such as the content he/she views, self declared interests, attributes or characteristics, user activities, and/or events from third party platforms. In an embodiment, the user understanding unit 155 receives inputs from social media content source identifier 195. Social media content source identifier 195 relies on user 105's social media content to personalize the user's profile. By analyzing the user's social media pages, likes, shares, etc, social media content source identifier 195 provides information for user understanding unit 155. The social media content source identifier 195 is capable of recognizing new content sources by identifying, e.g., quality curators on social media platforms such as Twitter, Facebook, or blogs, and enables the personalized content recommendation module 100 to discover new content sources from where quality content can be added to the content pool 135. The information generated by social media content source identifier 195 may be sent to a content/concept analyzer 145 and then mapped to specific category or classification based on content taxonomy 165 as well as a knowledge archives 115 classification system.

The third party interest analyzer 190 leverages information from other third party platforms about users active on such third party platforms, their interests, as well as content these third party users to enhance the performance of the user understanding unit 155. For example, when information about a large user population can be accessed from one or more third party platforms, the user understanding unit 155 can rely on data about a large population to establish a baseline interest profile to make the estimation of the interests of individual users more precise and reliable, e.g., by comparing interest data with respect to a particular user with the baseline interest profile which will capture the user's interests with a high level of certainty.

When new content is identified from content source 110 or third party platforms 120, it is processed and its concepts are analyzed. The concepts can be mapped to one or more categories in the content taxonomy 165 and the knowledge archives 115. The content taxonomy 165 is an organized structure of concepts or categories of concepts and it may contain a few hundred classifications of a few thousand. The knowledge archives 115 may provide millions of concepts, which may or may not be structures in a similar manner as the content taxonomy 165. Such content taxonomy and knowledge archives may serve as a universal interest space. Concepts estimated from the content can be mapped to a universal interest space and a high dimensional vector can be constructed for each piece of content and used to characterize the content. Similarly, for each user, a personal interest profile may also be constructed, mapping the user's interests, characterized as concepts, to the universal interest space so that a high dimensional vector can be constructed with the user's interests levels populated in the vector.

Content pool 135 may be a general content pool with content to be used to serve all users. The content pool 135 may also be structured so that it may have personalized content pool for each user. In this case, content in the content pool is generated and retained with respect to each individual user. The content pool may also be organized as a tiered system with both the general content pool and personalized individual content pools for different users. For example, in each content pool for a user, the content itself may not be physically present but is operational via links, pointers, or indices which provide references to where the actual content is stored in the general content pool.

Content pool 135 is dynamically updated by content pool generation/update module 140. Content in the content pool comes and go and decisions are made based on the dynamic information of the users, the content itself, as well as other types of information. For example, when the performance of content deteriorates, e.g., low level of interests exhibited from users, the content pool generation/update unit 140 may decide to purge it from the content pool. When content becomes stale or outdated, it may also be removed from the content pool. When there is a newly detected interest from a user, the content pool generation/update unit 140 may fetch new content aligning with the newly discovered interests. User events may be an important source of making observations as to content performance and user interest dynamics. User activities are analyzed by the user event analyzer 175 and such Information is sent to the content pool generation/update unit 140. When fetching new content, the content pool generation/update unit 140 invokes the content crawler 150 to gather new content, which is then analyzed by the content/concept analyzer 145, then evaluated by the content pool generation/update unit 140 as to its quality and performance before it is decided whether it will be included in the content pool or not. Content may be removed from content pool 135 because it is no longer relevant, because other users are not considering it to be of high quality or because it is no longer timely. As content is constantly changing and updating content pool 135 is constantly changing and updating providing user 105 with a potential source for high quality, timely personalized content.

In addition to content, personalized content recommendation module 100 provides for targeted or personalized advertisement content from advertisers 125. Advertisement database 126 houses advertising content to be inserted into a user's content stream. Advertising content from ad database 126 is inserted into the content stream via Content ranking unit 210. The personalized selection of advertising content can be based on the user's profile. Content/advertisement/user taxonomy correlator 205 may re-project or map a separate advertisement taxonomy 127 to the taxonomy associated with the user profiles 160. Content/advertisement/user taxonomy correlator 205 may apply a straight mapping or may apply some intelligent algorithm to the re-projection to determine which of the users may have a similar or related interest based on similar or overlapping taxonomy categories.

Content ranking unit 210 generates the content stream to be recommended to user 105 based on content, selected from content pool 135 based on the user's profile, as well as advertisement, selected by the advertisement insertion unit 200. The content to be recommended to the user 105 may also be determined, by the content ranking unit 210, based on information from the context information analyzer 170. For example, if a user is currently located in a beach town which differs from the zip code in the user's profile, it can be inferred that the user may be on vacation. In this case, information related to the locale where the user is currently in may be forwarded from the context information analyzer to the Content ranking unit 210 so that it can select content that not only fit the user's interests but also is customized to the locale. Other context information include day, time, and device type. The context information can also include an event detected on the device that the user is currently using such as a browsing event of a website devoted to fishing. Based on such a detected event, the momentary interest of the user may be estimated by the context information analyzer 170, which may then direct the Content ranking unit 210 to gather content related to fishing amenities in the locale the user is in for recommendation.

The personalized content recommendation module 100 can also be configured to allow probing content to be included in the content to be recommended to the user 105, even though the probing content does not represent subject matter that matches the current known interests of the user. Such probing content is selected by the unknown interest explorer 215. Once the probing content is incorporated in the content to be recommended to the user, information related to user activities directed to the probing content (including no action) is collected and analyzed by the user event analyzer 175, which subsequently forwards the analysis result to long/short term interest identifiers 180 and 185. If an analysis of user activities directed to the probing content reveals that the user is or is not interested in the probing content, the user understanding unit 155 may then update the user profile associated with the probed user accordingly. This is how unknown interests may be discovered. In some embodiments, the probing content is generated based on the current focus of user interest (e.g., short term) by extrapolating the current focus of interests. In some embodiments, the probing content can be identified via a random selection from the general content, either from the content pool 135 or from the content sources 110, so that an additional probing can be performed to discover unknown interests.

To identify personalized content for recommendation to a user, the content ranking unit 210 takes all these inputs and identify content based on a comparison between the user profile vector and the content vector in a multiphase ranking approach. The selection may also be filtered using context information. Advertisement to be inserted as well as possibly probing content can then be merged with the selected personalized content.

Figure 2:
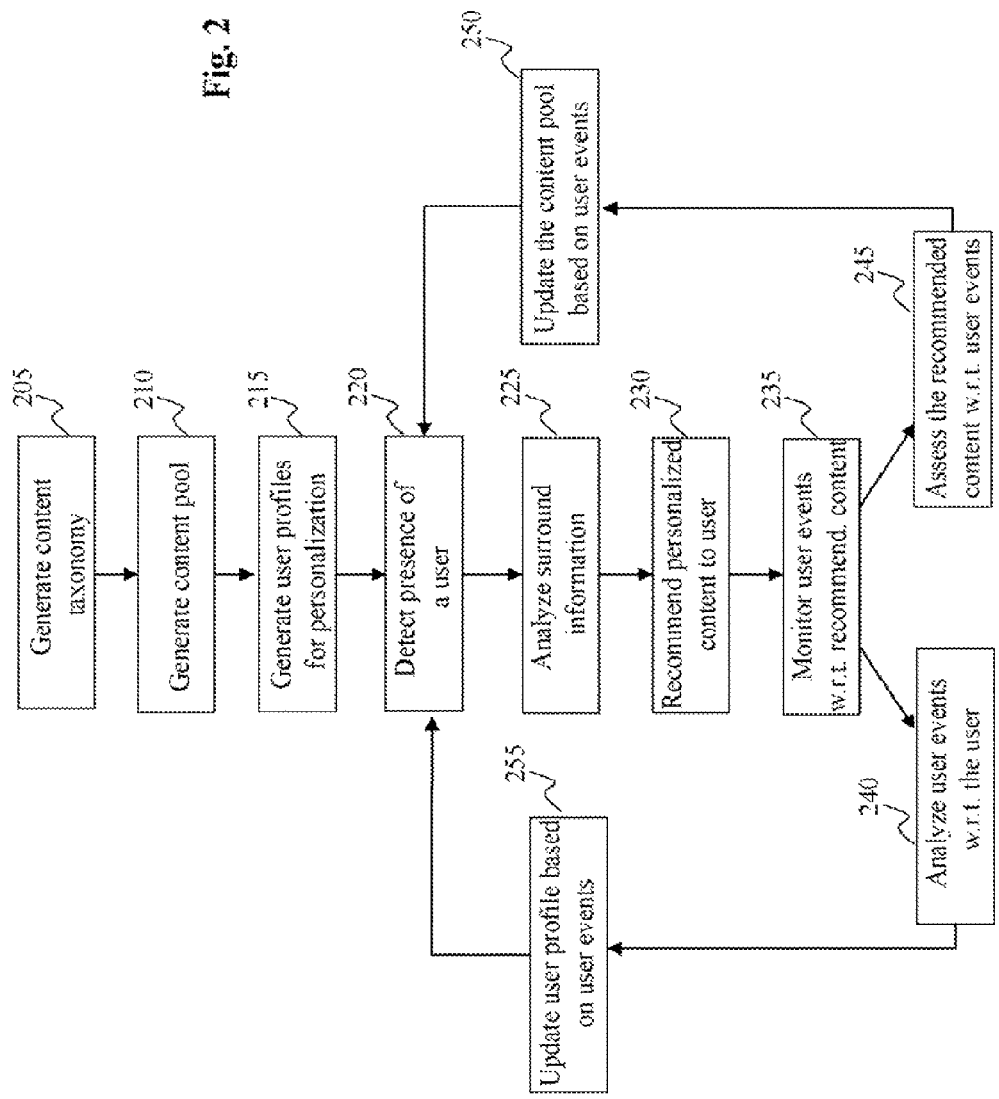
FIG. 2 is a flowchart of an exemplary process for personalized content recommendation, according to an embodiment of the present teaching.
Figure 3:
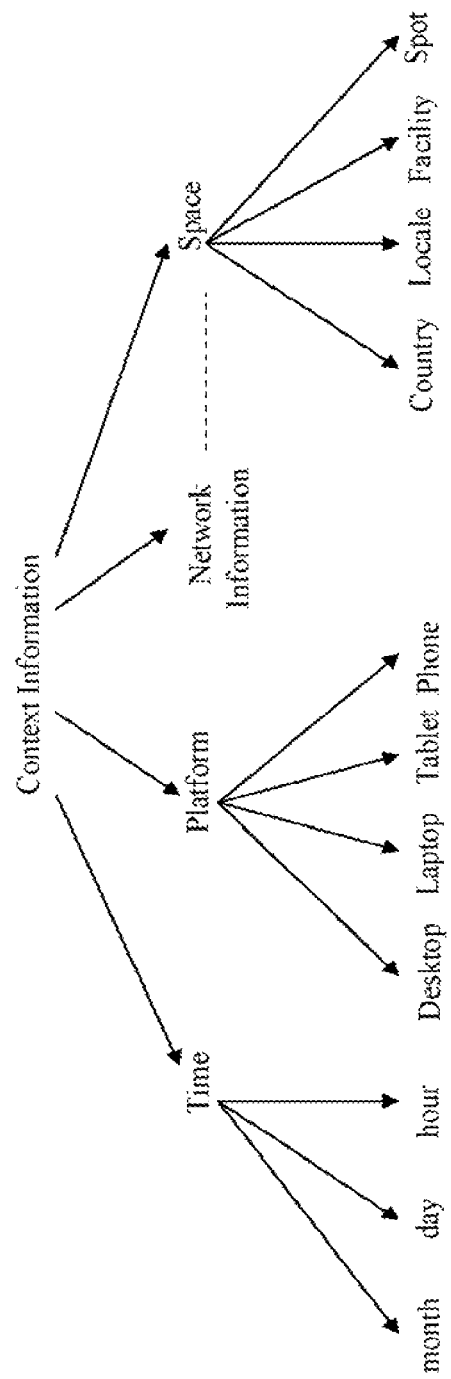
FIG. 3 illustrates exemplary types of context information.

FIG. 2 is a flowchart of an exemplary process for personalized content recommendation, according to an embodiment of the present teaching. Content taxonomy is generated at 205. Content is accessed from different content sources and analyzed and classified into different categories, which can be pre-defined. Each category is given some labels and then different categories are organized into some structure, e.g., a hierarchical structure. A content pool is generated at 210. Different criteria may be applied when the content pool is created. Examples of such criteria include topics covered by the content in the content pool, the performance of the content in the content pool, etc. Sources from which content can be obtained to populate the content pool include content sources 110 or third party platforms 120 such as Facebook, Twitter, blogs, etc. FIG. 3 provides a more detailed exemplary flowchart related to content pool creation, according to an embodiment of the present teaching. User profiles are generated at 215 based on, e.g., user information, user activities, identified short/long term interests of the user, etc. The user profiles may be generated with respect to a baseline population interest profile, established based on, e.g., information about third party interest, knowledge archives, and content taxonomies.

Figure 4:
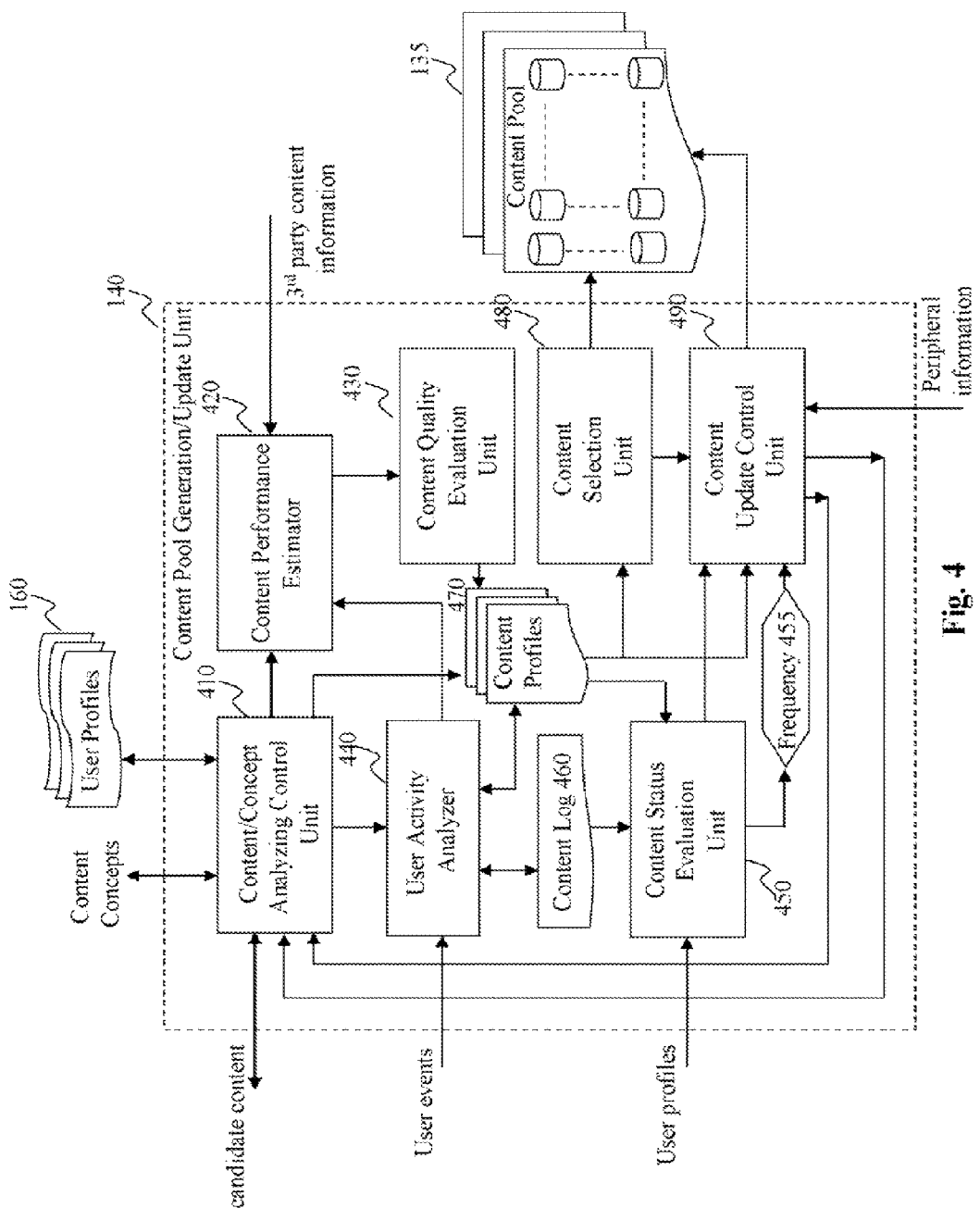
FIG. 4 depicts an exemplary diagram of a content pool generation/update unit, according to an embodiment of the present teaching.

Once the user profiles and the content pool are created, when the system 10 detects the presence of a user, at 220, the context information, such as locale, day, time, may be obtained and analyzed, at 225. FIG. 4 illustrates exemplary types of context information. Based on the detected user's profile, optionally context information, personalized content is identified for recommendation. A high level exemplary flow for generating personalized content for recommendation is presented in FIG. 5. Such gathered personalized content may be ranked and filtered to achieve a reasonable size as to the amount of content for recommendation. Optionally (not shown), advertisement as well as probing content may also be incorporated in the personalized content. Such content is then recommended to the user at 230.

User reactions or activities with respect to the recommended content are monitored, at 235, and analyzed at 240. Such events or activities include clicks, skips, dwell time measured, scroll location and speed, position, time, sharing, forwarding, hovering, motions such as shaking, etc. It is understood that any other events or activities may be monitored and analyzed. For example, when the user moves the mouse cursor over the content, the title or summary of the content may be highlighted or slightly expanded. In anther example, when a user interacts with a touch screen by her/his finger[s], any known touch screen user gestures may be detected. In still another example, eye tracking on the user device may be another user activity that is pertinent to user behaviors and can be detected. The analysis of such user events includes assessment of long term interests of the user and how such exhibited short term interests may influence the system's understanding of the user's long term interests.

Information related to such assessment is then forwarded to the user understanding unit 155 to guide how to update, at 255, the user's profile. At the same time, based on the user's activities, the portion of the recommended content that the user showed interests are assessed, at 245, and the result of the assessment is then used to update, at 250, the content pool. For example, if the user shows interests on the probing content recommended, it may be appropriate to update the content pool to ensure that content related to the newly discovered interest of the user will be included in the content pool.

FIG. 3 illustrates different types of context information that may be detected and utilized in assisting to personalize content to be recommended to a user. In this illustration, context information may include several categories of data, including, but not limited to, time, space, platform, and network conditions. Time related information can be time of the year (e.g., a particular month from which season can be inferred), day of a week, specific time of the day, etc. Such information may provide insights as to what particular set of interests associated with a user may be more relevant. To infer the particular interests of a user at a specific moment may also depend on the locale that the user is in and this can be reflected in the space related context information, such as which country, what locale (e.g., tourist town), which facility the user is in (e.g., at a grocery store), or even the spot the user is standing at the moment (e.g., the user may be standing in an aisle of a grocery store where cereal is on display). Other types of context information includes the specific platform related to the user's device, e.g., Smartphone, Tablet, laptop, desktop, bandwidth/data rate allowed on the user's device, which will impact what types of content may be effectively presented to the user. In addition, the network related information such as state of the network where the user's device is connected to, the available bandwidth under that condition, etc. may also impact what content should be recommended to the user so that the user can receive or view the recommended content with reasonable quality.

FIG. 4 depicts an exemplary system diagram of the content pool generation/update unit 140, according to an embodiment of the present teaching. The content pool 135 can be initially generated and then maintained according to the dynamics of the users, contents, and needs detected. In this illustration, the content pool generation/update unit 140 comprises a content/concept analyzing control unit 410, a content performance estimator 420, a content quality evaluation unit 430, a content selection unit 480, which will select appropriate content to place into the content pool 135. In addition, to control how content is to be updated, the content pool generation/update unit 140 also includes a user activity analyzer 440, a content status evaluation unit 450, and a content update control unit 490.

The content/concept analyzing control unit 410 interfaces with the content crawler 150 (FIG. 1) to obtain candidate content that is to be analyzed to determine whether the new content is to be added to the content pool. The content/concept analyzing control unit 410 also interfaces with the content/concept analyzer 145 (see FIG. 1) to get the content analyzed to extract concepts or subjects covered by the content. Based on the analysis of the new content, a high dimensional vector for the content profile can be computed via, e.g., by mapping the concepts extracted from the content to the universal interest space, e.g., defined via Wikipedia or other content taxonomies. Such a content profile vector can be compared with user profiles 160 to determine whether the content is of interest to users. In addition, content is also evaluated in terms of its performance by the content performance estimator 420 based on, e.g., third party information such as activities of users from third party platforms so that the new content, although not yet acted upon by users of the system, can be assessed as to its performance. The content performance information may be stored, together with the content's high dimensional vector related to the subject of the content, in the content profile 470. The performance assessment is also sent to the content quality evaluation unit 430, which, e.g., will rank the content in a manner consistent with other pieces of content in the content pool. Based on such rankings, the content selection unit 480 then determines whether the new content is to be incorporated into the content pool 135.

To dynamically update the content pool 135, the content pool generation/update unit 140 may keep a content log 460 with respect to all content presently in the content pool and dynamically update the log when more information related to the performance of the content is received. When the user activity analyzer 440 receives information related to user events, it may log such events in the content log 460 and perform analysis to estimate, e.g., any change to the performance or popularity of the relevant content over time. The result from the user activity analyzer 440 may also be utilized to update the content profiles, e.g., when there is a change in performance. The content status evaluation unit 450 monitors the content log and the content profile 470 to dynamically determine how each piece of content in the content pool 135 is to be updated. Depending on the status with respect to a piece of content, the content status evaluation unit 450 may decide to purge the content if its performance degrades below a certain level. It may also decide to purge a piece of content when the overall interest level of users of the system drops below a certain level. For content that requires update, e.g., news or journals, the content status evaluation unit 450 may also control the frequency 455 of the updates based on the dynamic information it receives. The content update control unit 490 carries out the update jobs based on decisions from the content status evaluation unit 450 and the frequency at which certain content needs to be updated. The content update control unit 490 may also determine to add new content whenever there is peripheral information indicating the needs, e.g., there is an explosive event and the content in the content pool on that subject matter is not adequate. In this case, the content update control unit 490 analyzes the peripheral information and if new content is needed, it then sends a control signal to the content/concept analyzing control unit 410 so that it can interface with the content crawler 150 to obtain new content.

Figure 5:
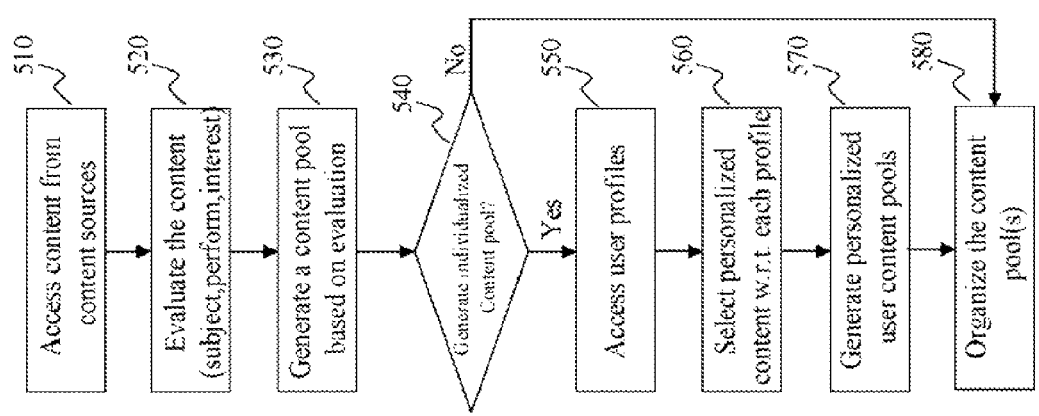
FIG. 5 is a flowchart of an exemplary process of creating a content pool, according to an embodiment of the present teaching.

FIG. 5 is a flowchart of an exemplary process of creating the content pool, according to an embodiment of the present teaching. Content is accessed at 510 from content sources, which include content from content portals such as Yahoo!, general Internet sources such as web sites or FTP sites, social media platforms such as Twitter, or other third party platforms such as Facebook. Such accessed content is evaluated, at 520, as to various considerations such as performance, subject matters covered by the content, and how it fit users' interests. Based on such evaluation, certain content is selected to generate, at 530, the content pool 135, which can be for the general population of the system or can also be further structured to create sub content pools, each of which may be designated to a particular user according to the user's particular interests. At 540, it is determined whether user-specific content pools are to be created. If not, the general content pool 135 is organized (e.g., indexed or categorized) at 580. If individual content pools for individual users are to be created, user profiles are obtained at 550, and with respect to each user profile, a set of personalized content is selected at 560 that is then used to create a sub content pool for each such user at 570. The overall content pool and the sub content pools are then organized at 580.

Figure 6:
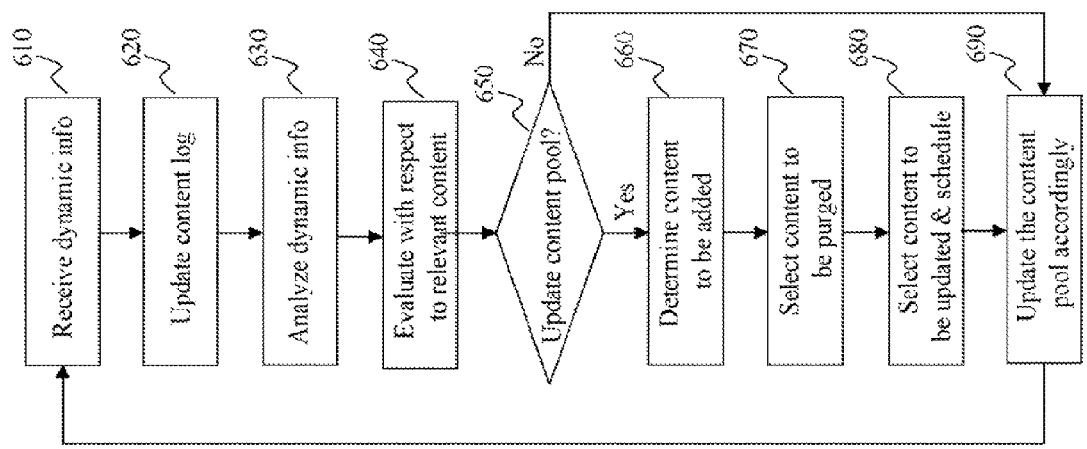
FIG. 6 is a flowchart of an exemplary process for updating a content pool, according to an embodiment of the present teaching.

FIG. 6 is a flowchart of an exemplary process for updating the content pool 135, according to an embodiment of the present teaching. Dynamic information is received at 610 and such information includes user activities, peripheral information, user related information, etc. Based on the received dynamic information, the content log is updated at 620 and the dynamic information is analyzed at 630. Based on the analysis of the received dynamic information, it is evaluated, at 640, with respect to the content implicated by the dynamic information, as to the change of status of the content. For example, if received information is related to user activities directed to specific content pieces, the performance of the content piece may need to be updated to generate a new status of the content piece. It is then determined, at 650, whether an update is needed. For instance, if the dynamic information from a peripheral source indicates that content of certain topic may have a high demand in the near future, it may be determined that new content on that topic may be fetched and added to the content pool. In this case, at 660, content that needs to be added is determined. In addition, if the performance or popularity of a content piece has just dropped below an acceptable level, the content piece may need to be purged from the content pool 135. Content to be purged is selected at 670. Furthermore, when update is needed for regularly refreshed content such as journal or news, the schedule according to which update is made may also be changed if the dynamic information received indicates so. This is achieved at 680.

Figure 7:
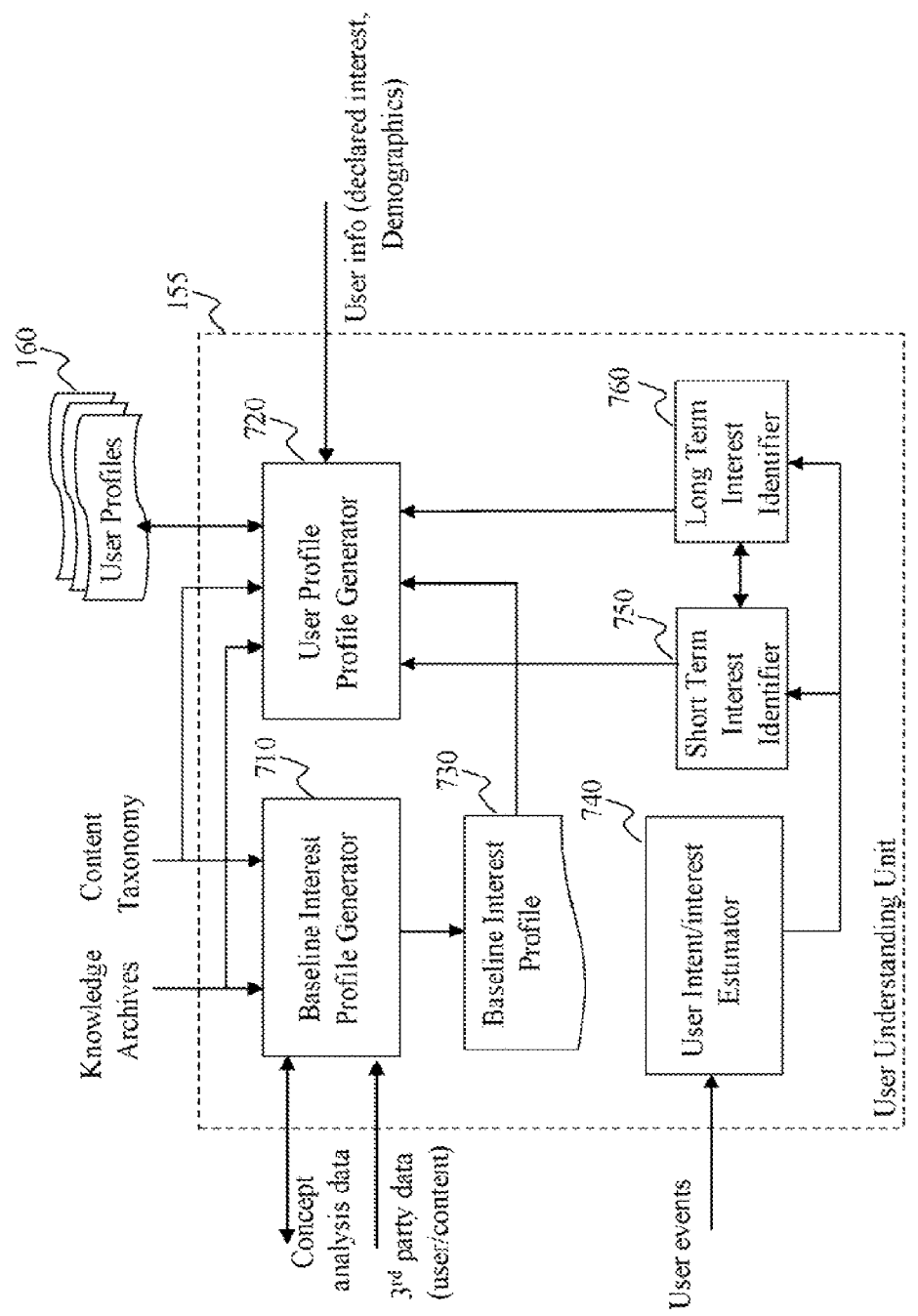
FIG. 7 depicts an exemplary diagram of a user understanding unit, according to an embodiment of the present teaching.

FIG. 7 depicts an exemplary diagram of the user understanding unit 155, according to an embodiment of the present teaching. In this exemplary construct, the user understanding unit 155 comprises a baseline interest profile generator 710, a user profile generator 720, a user intent/interest estimator 740, a short term interest identifier 750 and a long term interest identifier 760. In operation, the user understanding unit 155 takes various input and generates user profiles 160 as output. Its input includes third party data such as users' information from such third party platforms as well as content such users accessed and expressed interests, concepts covered in such third party data, concepts from the universal interest space (e.g., Wikipedia or content taxonomy), information about users for whom the personalized profiles are to be constructed, as well as information related to the activities of such users. Information from a user for whom a personalized profile is to be generated and updated includes demographics of the user, declared interests of the user, etc. Information related to user events includes the time, day, location at which a user conducted certain activities such as clicking on a content piece, long dwell time on a content piece, forwarding a content piece to a friend, etc.

In operation, the baseline interest profile generator 710 access information about a large user population including users' interests and content they are interested in from one or more third party sources (e.g., Facebook). Content from such sources is analyzed by the content/concept analyzer 145 (FIG. 1), which identifies the concepts from such content. When such concepts are received by the baseline interest profile generator 710, it maps such concepts to the knowledge archives 115 and content taxonomy 165 (FIG. 1) and generate one or more high dimensional vectors which represent the baseline interest profile of the user population. Such generated baseline interest profile is stored at 730 in the user understanding unit 155. When there is similar data from additional third party sources, the baseline interest profile 730 may be dynamically updated to reflect the baseline interest level of the growing population.

Once the baseline interest profile is established, when the user profile generator receives user information or information related to estimated short term and long term interests of the same user, it may then map the user's interests to the concepts defined by, e.g., the knowledge archives or content taxonomy, so that the user's interests are now mapped to the same space as the space in which the baseline interest profile is constructed. The user profile generator 720 then compares the user's interest level with respect to each concept with that of a larger user population represented by the baseline interest profile 730 to determine the level of interest of the user with respect to each concept in the universal interest space. This yields a high dimensional vector for each user. In combination with other additional information, such as user demographics, etc., a user profile can be generated and stored in 160.

User profiles 160 are updated continuously based on newly received dynamic information. For example, a user may declare additional interests and such information, when received by the user profile generator 720, may be used to update the corresponding user profile. In addition, the user may be active in different applications and such activities may be observed and information related to them may be gathered to determine how they impact the existing user profile and when needed, the user profile can be updated based on such new information. For instance, events related to each user may be collected and received by the user intent/interest estimator 740. Such events include that the user dwelled on some content of certain topic frequently, that the user recently went to a beach town for surfing competition, or that the user recently participated in discussions on gun control, etc. Such information can be analyzed to infer the user intent/interests. When the user activities relate to reaction to content when the user is online, such information may be used by the short term interest identifier 750 to determine the user's short term interests. Similarly, some information may be relevant to the user's long term interests. For example, the number of requests from the user to search for content related to diet information may provide the basis to infer that the user is interested in content related to diet. In some situations, estimating long term interest may be done by observing the frequency and regularity at which the user accesses certain type of information. For instance, if the user repeatedly and regularly accesses content related to certain topic, e.g., stocks, such repetitive and regular activities of the user may be used to infer his/her long term interests. The short term interest identifier 750 may work in connection with the long term interest identifier 760 to use observed short term interests to infer long term interests. Such estimated short/long term interests are also sent to the user profile generator 720 so that the personalization can be adapted to the changing dynamics.

Figure 8:
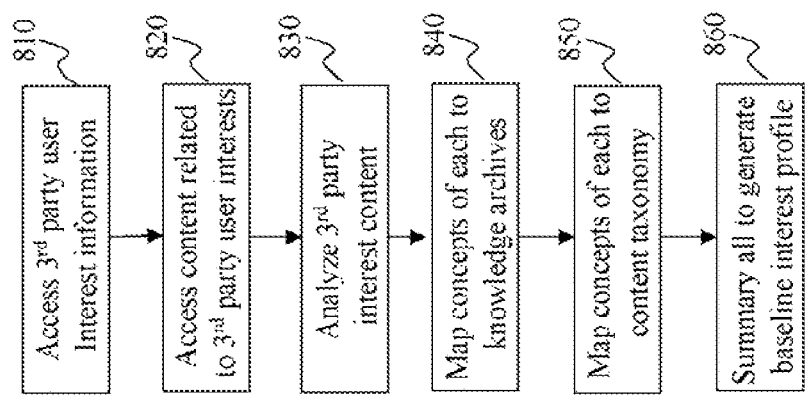
FIG. 8 is a flowchart of an exemplary process for generating a baseline interest profile, according to an embodiment of the present teaching.

FIG. 8 is a flowchart of an exemplary process for generating a baseline interest profile based on information related to a large user population, according to an embodiment of the present teaching. The third party information, including both user interest information as well as their interested content, is accessed at 810 and 820. The content related to the third party user interests is analyzed at 830 and the concepts from such content are mapped, at 840 and 850, to knowledge archives and/or content taxonomy. To build a baseline interest profile, the mapped vectors for third party users are then summarized to generate a baseline interest profile for the population.

There can be a variety ways to summarize the vectors to generate an averaged interest profile with respect to the underlying population.

Figure 9:
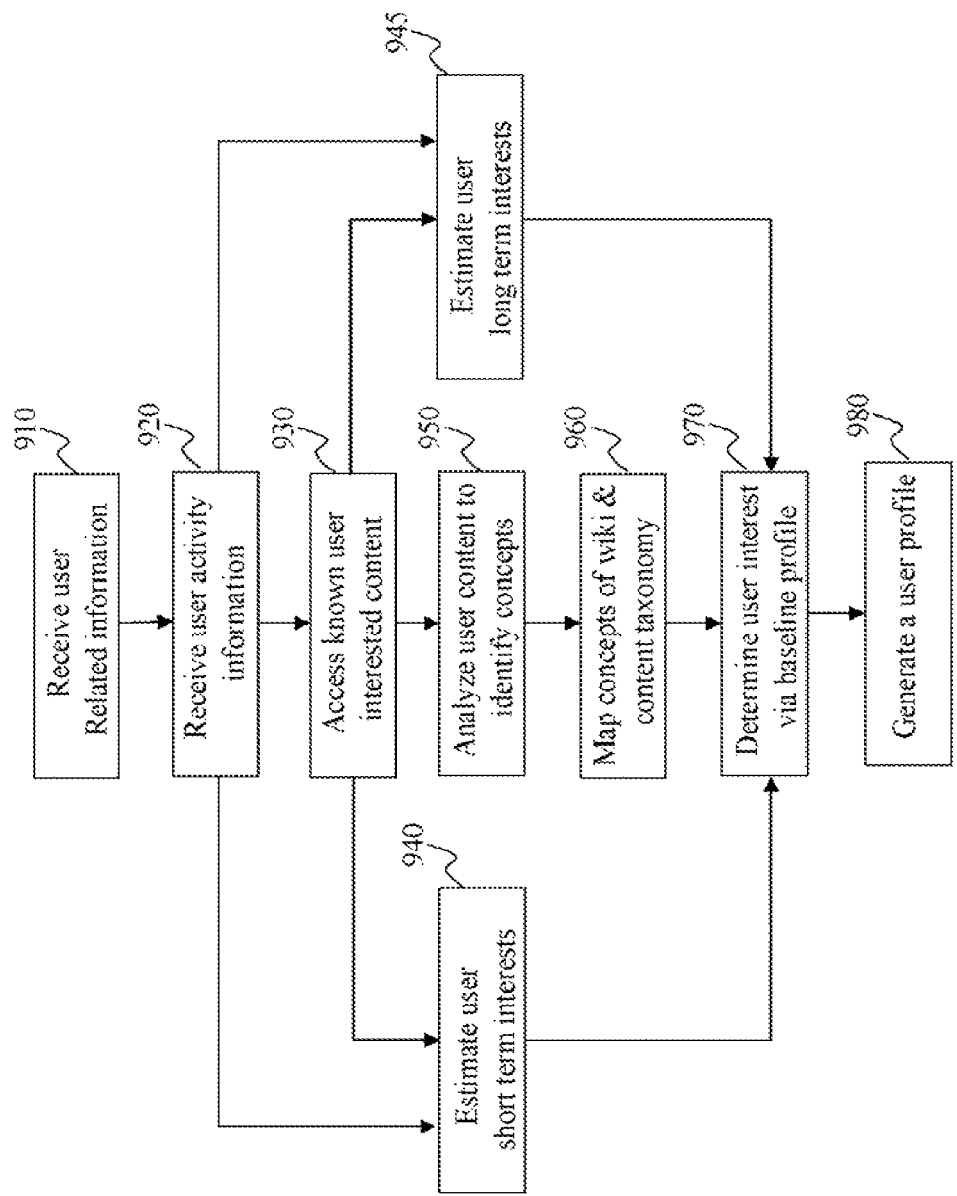
FIG. 9 is a flowchart of an exemplary process for generating a personalized user profile, according to an embodiment of the present teaching.

FIG. 9 is a flowchart of an exemplary process for generating/updating a user profile, according to an embodiment of the present teaching. User information is received first at 910. Such user information includes user demographics, user declared interests, etc. Information related to user activities is also received at 920. Content pieces that are known to be interested by the user are accessed at 930, which are then analyzed, at 950, to extract concepts covered by the content pieces. The extracted concepts are then mapped, at 960, to the universal interest space and compared with, concept by concept, the baseline interest profile to determine, at 970, the specific level of interest of the user given the population. In addition, the level of interests of each user may also be identified based on known or estimated short and long term interests that are estimated, at 940 and 945, respectively, based on user activities or content known to be interested by the user. A personalized user profile can then be generated, at 980, based on the interest level with respect to each concept in the universal interest space.

Figure 10:
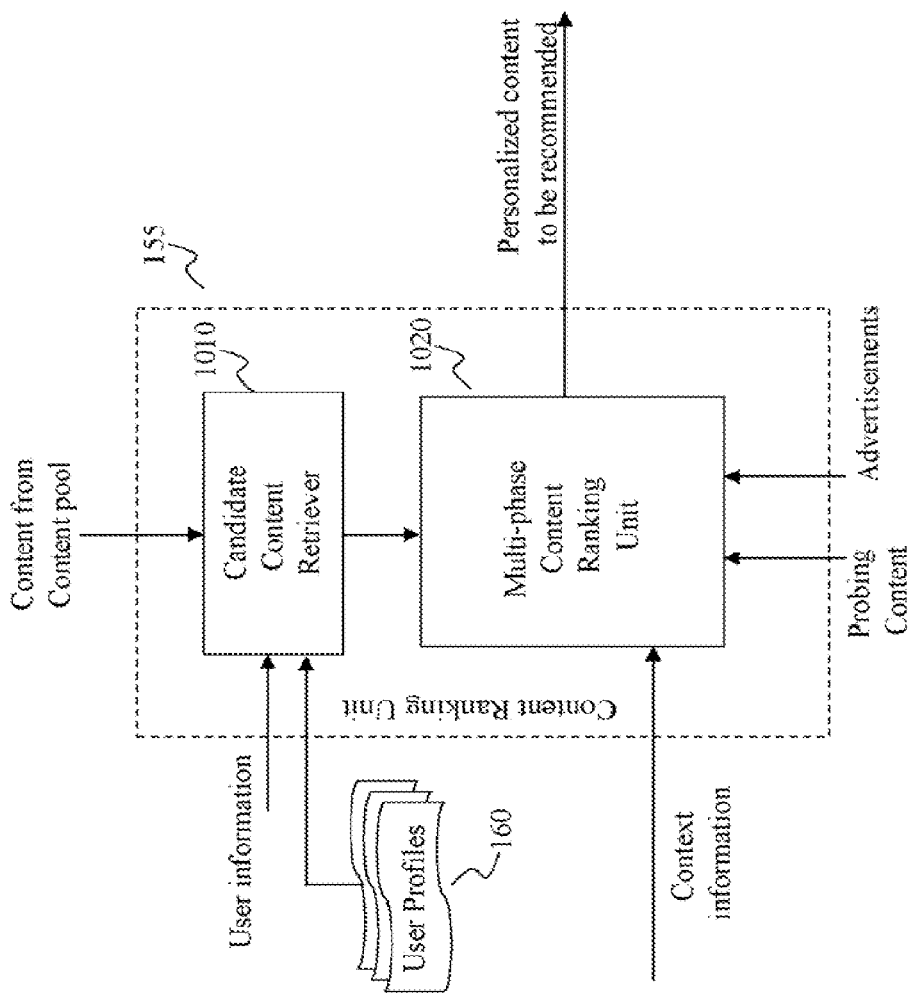
FIG. 10 depicts an exemplary system diagram for a content ranking unit, according to an embodiment of the present teaching.

FIG. 10 depicts an exemplary system diagram for the content ranking unit 210, according to an embodiment of the present teaching. The content ranking unit 210 takes variety of input and generates personalized content to be recommended to a user. The input to the content ranking unit 210 includes user information from the applications 130 with which a user is interfacing, user profiles 160, context information surrounding the user at the time, content from the content pool 135, advertisement selected by the ad insertion unit 200, and optionally probing content from the unknown interest explorer 215. The content ranking unit 210 comprises a candidate content retriever 1010 and a multi-phase content ranking unit 1020. Based on user information from applications 130 and the relevant user profile, the candidate content retriever 1010 determines the content pieces to be retrieved from the content pool 135. Such candidate content may be determined in a manner that is consistent with the user's interests or individualized. In general, there may be a large set of candidate content and it needs to be further determined which content pieces in this set are most appropriate given the context information. The multi-phase content ranking unit 1020 takes the candidate content from the candidate content retriever 1010, the advertisement, and optionally may be the probing content, as a pool of content for recommendation and then performs multiple stages of ranking, e.g., relevance based ranking, performance based ranking, etc. as well as factors related to the context surrounding this recommendation process, and selects a subset of the content to be presented as the personalized content to be recommended to the user.

Figure 11:
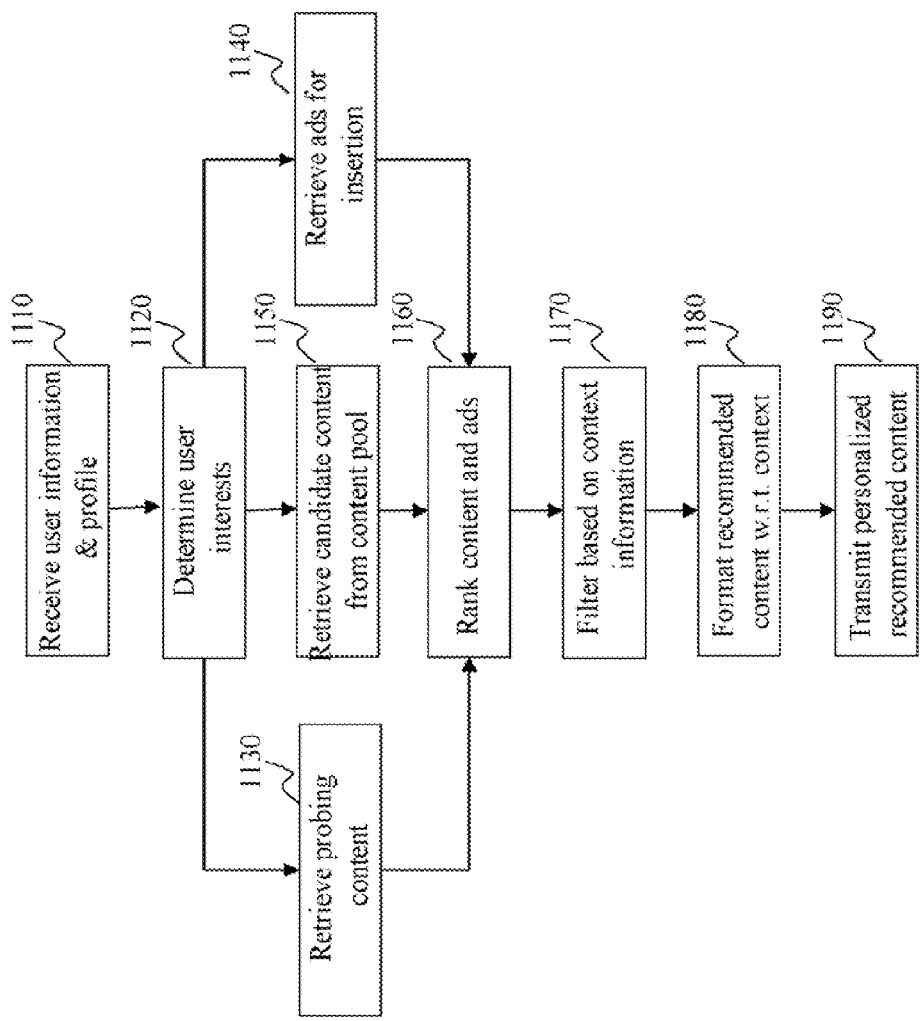
FIG. 11 is a flowchart of an exemplary process for the content ranking unit, according to an embodiment of the present teaching.

FIG. 11 is a flowchart of an exemplary process for the content ranking unit, according to an embodiment of the present teaching. User related information and user profile are received first at 1110. Based on the received information, user's interests are determined at 1120, which can then be used to retrieve, at 1150, candidate content from the content pool 135. The user's interests may also be utilized in retrieving advertisement and/or probing content at 1140 and 1130, respectively. Such retrieved content is to be further ranked, at 1160, in order to select a subset as the most appropriate for the user. As discussed above, the selection takes place in a multi-phase ranking process, each of the phases is directed to some or a combination of ranking criteria to yield a subset of content that is not only relevant to the user as to interests but also high quality content that likely will be interested by the user. The selected subset of content may also be further filtered, at 1170, based on, e.g., context information. For example, even though a user is in general interested in content about politics and art, if the user is currently in Milan, Italy, it is likely that the user is on vacation. In this context, rather than choosing content related to politics, the content related to art museums in Milan may be more relevant. The multi-phase content ranking unit 1020 in this case may filter out the content related to politics based on this contextual information. This yields a final set of personalized content for the user. At 1180, based on the contextual information associated with the surrounding of the user (e.g., device used, network bandwidth, etc.), the content ranking unit packages the selected personalized content, at 1180, in accordance with the context information and then transmits, at 1190, the personalized content to the user.

More detailed disclosures of various aspects of the system 10, particularly the personalized content recommendation module 100, are covered in different U.S. patent applications as well as PCT applications, entitled "Method and System For User Profiling Via Mapping Third Party Interests To A Universal Interest Space", "Method and System for Multi-Phase Ranking For Content Personalization", "Method and System for Measuring User Engagement Using Click/Skip In Content Stream", "Method and System for Dynamic Discovery And Adaptive Crawling of Content From the Internet", "Method and System For Dynamic Discovery of Interesting URLs From Social Media Data Stream", "Method and System for Discovery of User Unknown Interests", "Method and System for Efficient Matching of User Profiles with Audience Segments", "Method and System For Mapping Short Term Ranking Optimization Objective to Long Term Engagement", "Social Media Based Content Selection System", "Method and System For Measuring User Engagement From Stream Depth", "Method and System For Measuring User Engagement Using Scroll Dwell Time", "Almost Online Large Scale Collaborative Filtering Based Recommendation System," and "Efficient and Fault-Tolerant Distributed Algorithm for Learning Latent Factor Models through Matrix Factorization". The present teaching is particularly directed to an almost online large scale collaborative filtering based recommendation system.

Figure 12:
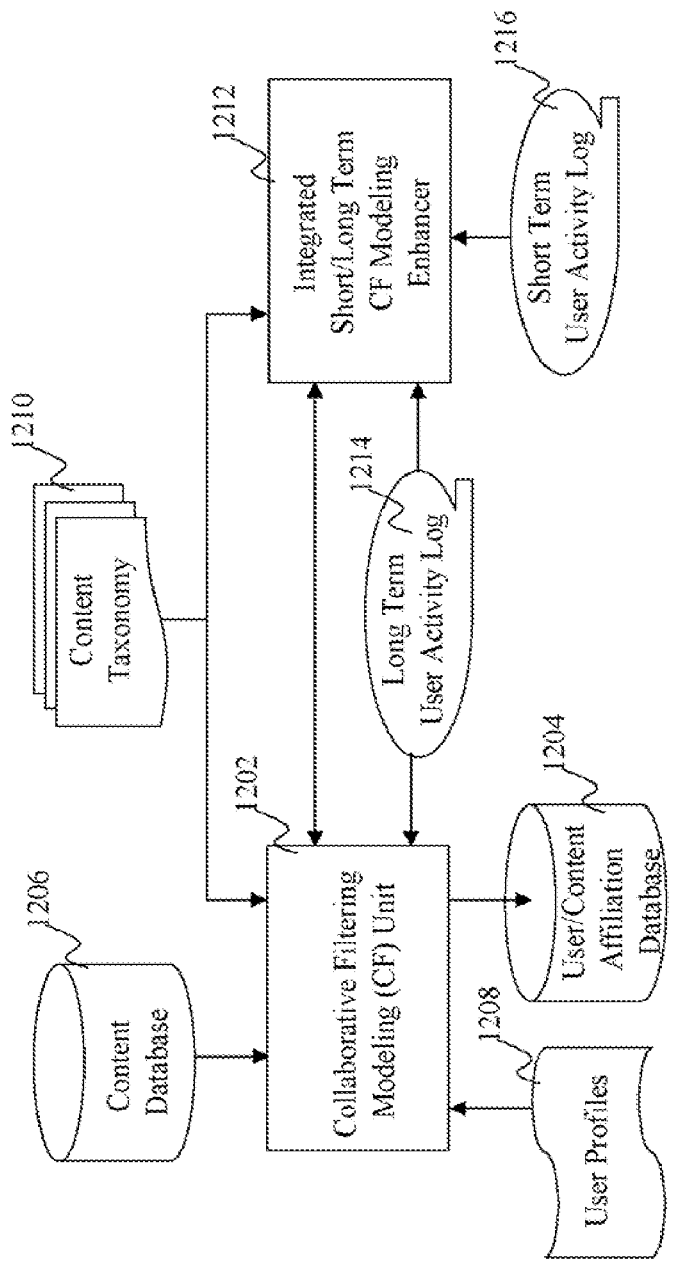
FIG. 12 is a diagram of a user understanding unit of FIG. 1, according to an embodiment of the present teaching.

To this end, FIG. 12 illustrates an embodiment of a user understanding unit 155 of FIG. 1 implemented by way of a collaborative filtering (CF) system 1200. The CF system 1200 determines user-content item affiliations based on executing computer readable instructions for evaluating various types of user activity and user profile information via a CF modeling unit 1202, which for instance implements a latent factor model technique, and outputs likely user-content item pairs based on corresponding affiliation scores. The user-content item pairs having an affiliation score that exceeds a predetermined threshold are added to the user-content affiliation database 1204 and subsequently to the content database 1206 for serving to the user as suggested content of interest. The latent factor model executed by the CF modeling unit 1202 characterizes both content items and users based on multiple factor vectors inferred from ratings and/or user activity patterns. In an embodiment, the latent factor model is implemented via a matrix factorization approach.

The CF modeling unit 1202 receives a plurality of input signals, including a long term user activity log comprising activity vector signals indicating user activity with respect to certain content. User activity with respect to a content item comprises user click data, user skip data derived from user click data or received via direct signaling, as well as user dwell data indicative of user inactivity with respect to a content item or part thereof, and scroll data indicative of scroll direction, scroll rate, and scroll extent, among other user activity information. The long term user activity log data 1214 includes activity data collected and buffered over a period of time exceeding a predetermined threshold, such as approximately on the order of an hour. In one embodiment, the long term activity log includes user activity data buffered over a six hour period.

The CF modeler 1202 also receives an input of user profile information 1208, including a declared interest vector for each user, which includes multiple values indicative of the user's interest in various types of content based on the user's interest indications received from social media sources (e.g., "likes," "shares," "tweets," "re-tweets," and the like with respect to certain content items), as well as static user profile data from electronic questionnaires, forms, and the like. In the context of evaluating user-content item affiliations, the CF modeler 1202 relies on content item taxonomy 1210, such as a Wikipedia™ (Wiki) content taxonomy indicating the content item's mapping to one or more content categories, for example.

The integrated short/long term modeling enhancer module 1212 implements parallel short-term and long-term model parameter learning processes in order to dynamically adjust CF model parameters of the CF modeling unit 1202, as discussed in further detail below. Thus, in addition to the long-term user activity log information 1214, the modeling enhancer 1212 also receives input of short-term user activity 1216. The short-term user activity log 1212 includes user activity data having duration that is shorter than the duration of the long-term user activity log 1214. In an embodiment, the duration of the short-term user activity log is on the order of minutes, such as five minutes of user activity data for example.

Figure 13:
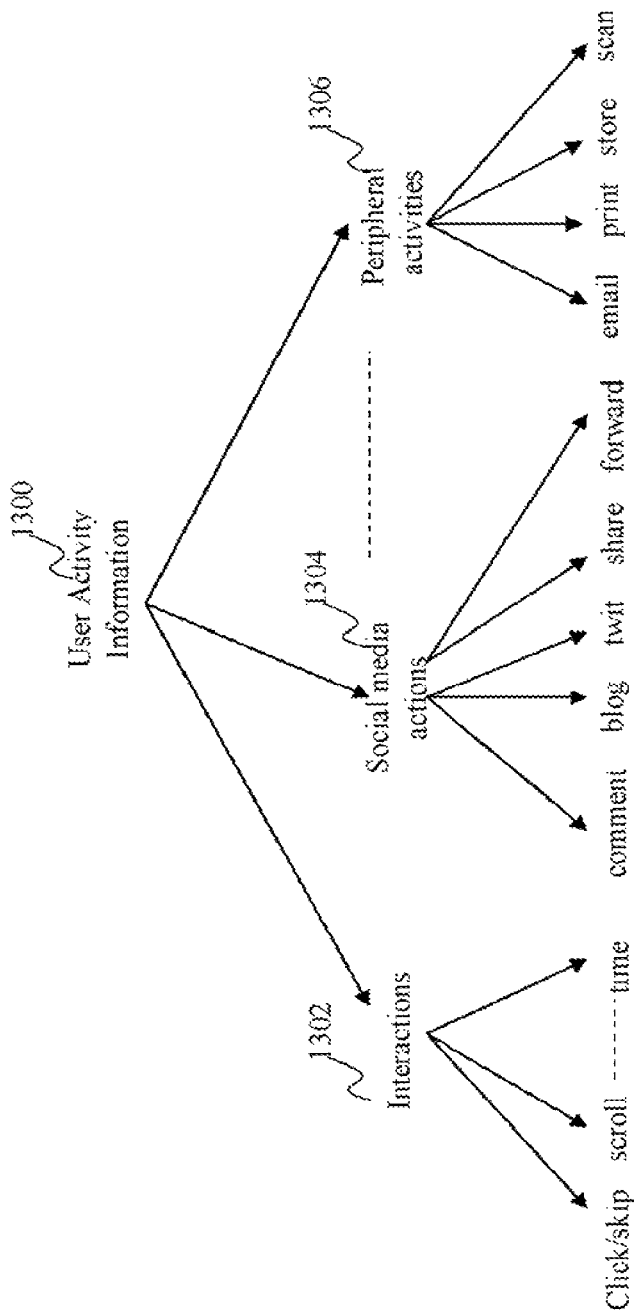
FIG. 13 is a diagram illustrating user activity data that is included in the user activity logs, according to an embodiment of the present teaching.

FIG. 13 illustrates an embodiment of the types of user activity 1300 with respect to a given content item that is included in the user activity logs 1214, 1216. In an embodiment, the user activity data 1300 comprises a vector having numerical indicators of user activity corresponding a plurality of categories, such as user interactions 1302 (e.g., item clicks, skips, scrolls, scroll rate, scroll direction, dwell time, among others), user's social media actions 1304 (e.g., comments with respect to a content item, blog activity, twit activity, share activity, forward activity), and peripheral device actions 1306 related to the content item (e.g., attaching an item to an email, printing a content item, storing a content item, and scanning a content item, for example). Embodiments of various user activity signals included in the long and short-term user activity logs 1214, 1216 include the following examples.

Entities:
Users (signed-in/authenticated or unregistered): Id, Categorical variables (Gender, geo information, and age), Creation timestamp.
Stories (or pages): Id, Categorical variables, a set of predetermined document property indicators, content category vector in accordance with a predetermined taxonomy, author, publisher, Publication timestamp.
Page features entities: a set of predetermined document property indicators, content category vector in accordance with a predetermined taxonomy, authors, and publishers.
User features related entities: Gender, geo information (e.g., country, State, zip code), and age.
User's Implicit Scores:
The following binary signals (or users' interactions) are available (in a batch or streaming scenario):

Page Views
Clicks or their Absence
Story was presented in a property (e.g., HomeRun page) and was clicked (in case order of presentation of all stories involved is available, the absence of clicks can be inferred).
In certain cases where the signals indicate only "positive" user-page interactions, "negative" user-page interactions may be inferred and generated from the signals.
For example, we may randomly pick a "popular" story that was likely viewed but not clicked by the user, as a "negative" interaction.
Commenting signals
Comment, reply, thumbs up/down
Social signals
Twitter, Facebook (FB) like, FB recommend, FB share, e-mail, Google Plus (g+), Linkedin share.
Local signals
print, save-for-later, among others.
In order not to increase model dimensions, user-page interaction sessions may be identified and corresponding implicit scores may be generated as a function of the above signals.
User i'th implicit score of page j is calculated as:

$$r_{ij} = \sum_m \alpha_m \beta_m$$

Figure 14:
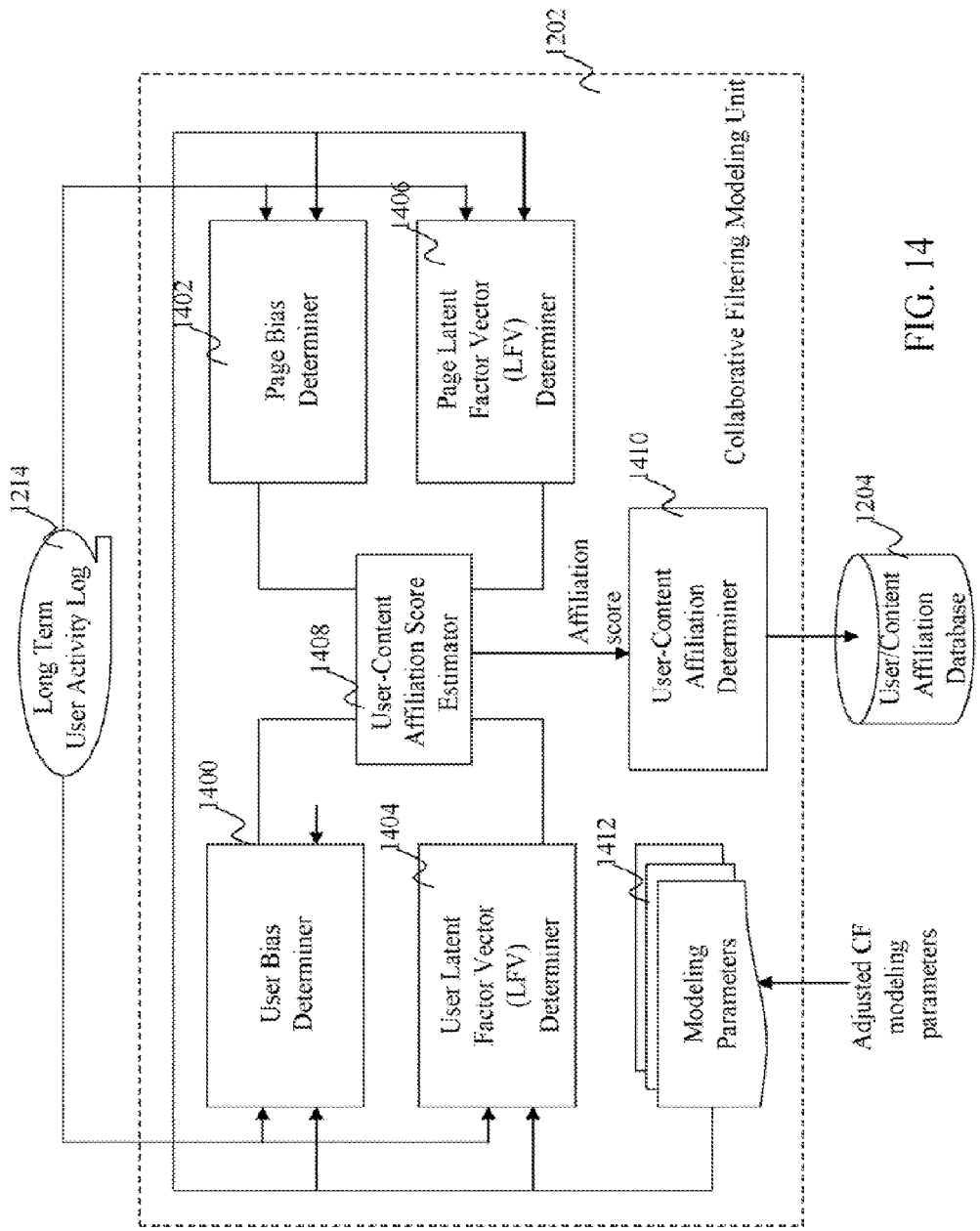
FIG. 14 is a diagram illustrating a collaborative filtering modeling unit, according to an embodiment of the present teaching.

The weights $\{\alpha_m\}$ can be optimized, in an advance stage, using bucket testing on real users' click-through rate (CTR).
Other functions such as $r_{ij} = \max_m \{\alpha_m \beta_m\}$ may be considered as well.
In an embodiment, context signals are generated for every implicit score:
Timestamp
May be used to handle periodic changes
May be used to "boost" recent events during the learning process
Property name where user-page interaction took place
May be used to handle presentation biases.
FIG. 14 illustrates an embodiment of the CF modeling unit 1202 of FIG. 6 in further detail. In the illustrated embodiment, the CF modeling unit 1202 executes computer readable instructions that implement a latent factor model technique of collaborative filtering by estimating bias and latent factor vector (LFV) parameters for the user and corresponding content page and determining a user-content affiliation score to identify suitable user-content pairs for inclusion into the user/content affiliation database 1204 of the content personalization unit. The user bias determiner 1400 and page bias determiner 1402 receive input of long-term user activity log 1214 and calculate respective user and page bias factors. Similarly, the user and page latent factor vector determining units 1404, 1406 determine the LFV vector values for the user and content page, respectively, based on the long term user activity input. The user-content affiliation score estimator unit 1408, in turn, determines an affiliation score for the user-page pair based on the bias value and LFV vector inputs, in accordance with an embodiment of the latent factor model algorithm discussed below. The user-content affiliation determiner module 1410 applies a predetermined threshold to the affiliation scores estimated by the user-content affiliation score estimator 1408 to select user-content pairs that represent a likelihood of a user's interest in the paired content page(s). The user-content pairs that meet or exceed the predetermined affiliation score threshold are stored in the user/content database 1204. As discussed in further detail below, the bias and LFV determiner modules 1400-1406 of the CF modeling unit 1202 periodically receive a set of modified CF modeling parameters 1412 from the short/long term modeling enhancer unit 1212 in order to retrain the entire set of parameters for the underlying CF model, for instance as a result of Mean Square Error (MSE) minimization process that retrains all model parameters based on long-term user activity log data.

The following discussion describes an embodiment of a low ranked Matrix Factorization (MF) implementation of a collaborative filtering model algorithm (also referred to as a latent factor model) stored as computer readable instructions in non-transient computer memory and executed via one or more computer processors of the CF modeling unit 1202.

In an embodiment of a low ranked Matrix Factorization (MF) implementation of collaborative filtering (also referred to as latent factor model), each entity (users, users' features, stories, and stories' features) is assigned an l dimensions latent factor vector (LFV) and a bias.

New entities' parameters are initialized using a random generator of a zero mean Gaussian distribution with standard deviation σ.

User Parameters
Overall i'Th User Bias $$b_i = c_i + \sum_{f \in \theta_u} b_{f(i)}$$

$c_i \in R$—i'th user bias, $\theta_u$—set of user features, $b_{f(i)} \in R$—feature f(i) bias (some of the users features' biases may be forced to be zero)

Overall User's LFV $$q_i = p_i + \sum_{f \in \theta_u} q_{f(i)}$$

$p_i \in R^l$—i'th user LFV, $q_{f(i)} \in R^l$—feature f(i) LFV
$\theta_u$={gender, age, country, state, zip code}

To overcome data sparsity, smoothing may be useful. As an illustrative example, one embodiment uses a linear combination of features vectors of ages 20, 21, and 22 to represent the age of 21 in a 21 year old user model.

Page Parameters
Overall j'Th Page's Bias $$b_j = c_j + \sum_{f \in \theta_p} b_{f(j)}$$

$c_j \in R$—i'th page bias, $\theta_p$—set of page features, $b_{f(j)} \in R$—feature f(j) bias Overall Page's LFV $$q_j = p_j + \sum_{f \in \theta_p} q_{f(j)}$$

$p_j \in R^l$-j'th page LFV, $q_{f(j)} \in R^l$—feature f (j) LFV
$\theta_p$={YKT, author, publisher}

Since stories have a short "life" span we may represent stories by a normalized sum of their viewers' (users') LFVs. This "story-less" model is coupled neatly with the short-term learning process described below, and is also related to the story "cold-start" problem.

The affiliation (or estimated implicit score) of user i—page j is determined by:

$$\hat{r}_{ij} = b_i + b_j + q_i^T q_j$$

$q_i^T$ is the transpose of $q_j$

Model Storage:

In an embodiment, users are kept indefinitely in the model stored in a key-value store. Pages are kept in memory for $T_r$ hours (e.g., 48 hours).

Figure 15:
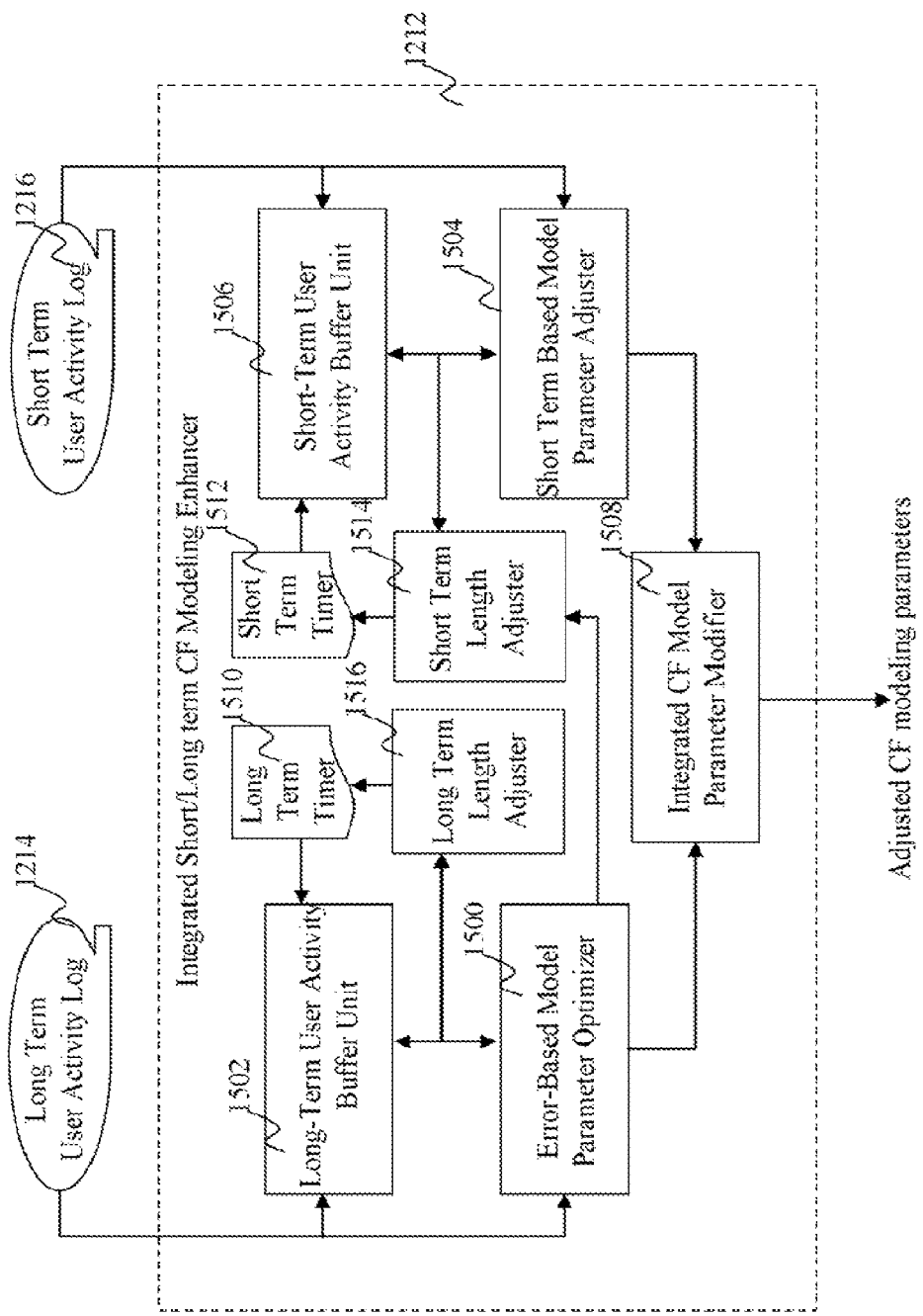
FIG. 15 is a diagram illustrating an integrated short/long term CF modeling enhancer module, according to an embodiment of the present teaching.

FIG. 15 illustrates an embodiment of the integrated short/long term CF modeling enhancer module 1212 in further detail. The modeling enhancer module 1212 implements a parallel long-term and short-term model learning processes with respect to the model parameters of the CF model executed by the CF modeling unit 1202. In particular, the long-term model learning process is executed via the long-term error-based model parameter optimizer 9500 that receives input of long-term user activity log data from the long-term user activity buffering unit 1502. The long-term model learning process entails a comprehensive process occurring several times a day, such as every six hours. The error-based model parameter optimizer 1500 uses user-page (story) interactions accumulated over the long-term user activity log period (e.g., six hours) and executes a collaborative filtering algorithm via a parallel computing technique to re-train the CF model in the modeler 1202. In an embodiment the error-based model parameter optimizer 1500 employs Mean Square Error (MSE) minimization to adjust all CF modeling parameters after each long-term learning cycle, as further discussed below.

The short-term based model parameter adjuster 1504 receives input of the short term user activity log data 1216 from the short term user activity buffering unit 1506 and executes an on-going short-term model learning process occurring every few minutes, for example. The short-term model learning process uses user-page (e.g., story or other content) interactions accumulated over the short-term user activity log period, such as five minutes, to perform an incremental update of values of those model parameters (e.g., at least some bias and/or LFV vector parameters values) that correspond to the change in the user activity vectors received during the corresponding short-term period.

The integrated CF model parameter modifier unit 1508 receives the adjusted CF modeling parameter information from the error-based model parameter optimizer 1500 and short term based model parameter adjuster 1504 and forwards the adjusted CF modeling parameters to the CF modeling unit 1202. In an embodiment, each of the short-term and long-term user activity buffering units 1502, 1506 is controlled via a corresponding timer 1510, 1512. In a further embodiment, the timers 1510, 1512 and the buffering units 1502, 1506 are dynamically controlled via corresponding adjuster modules 1514, 1516, for instance based on feedback from the long-term error-based model parameter adjuster 1500 and/or short term based model parameter adjuster 1504.

An embodiment of the long-term and short-term model learning processes is described below in further detail.

Long-Term Learning

Each learning phase covers a period of $T_l \leq T_T$ (e.g., 6 hours) and occurs every $T_{lt}$ hours (e.g., 6 hours)

Included Entities

All "active" users that made at least $\alpha_l^u$ ratings during $T_l$
All "popular" pages that has at least $\alpha_l^p$ ratings during $T_l$ For consistency, we may use a simple algorithm that alternately throws inactive users and unpopular pages until convergence (?)

Event split: we split the surviving interactions (both, real and inferred) into two sets Training set $\Omega_T$: 80% of all interactions, used for training the model Validation set $\Omega_V$: 20% of all interactions, used to evaluate the new model and optimize the meta parameters The split may be done according to Timeline Sampling Process (TBD)

Optimization: We seek to minimize the estimated scores mean squared error (MSE) over the training set $$e_{mse} = \sum_{(i,j) \in \Omega_T} (r_{ij} - \hat{r}_{ij})^2$$

Other objectives, such as log likelihood maximization or mean absolute error (MAE) may be considered as well Regularization: We use Tichonov quadratic regularization with parameter $\lambda$, to reduce overfitting of the model to the training set Add $$\sum_{\theta \in \Theta} n_\theta \frac{\lambda}{2} \|\theta\|^2$$

to the original error expression

Where $n_\theta$ is the number of interactions $\theta$ is involved with

Boosting: To boost recent interactions we may assign multiplicative weights to the summands of the original error expression a-la.

$$w_t = \left( \frac{1 + t - t_0}{1 + T_l - t_0} \right)^2$$

where t is the (i,j) training interaction time, and $t_D$ is the beginning time of the current long-term learning process Parallel implementation: Due to the sheer complexity of the problem (hundreds millions of users and tens of thousands of pages) a grid implementation of the long-term learning process is required. Since stochastic gradient decent (SGD) is not applicable for grid implementation other algorithms are considered Alternating Least Square (ALS) a-la.

Block gradient decent (BGD). Unlike SGD, where every parameter is updated for every relevant training event, applying BGD, every parameter is updated once for all relevant training events at every sweep Generate an intermediate model using estimated scores and errors, calculated using the current model. Hence, for each model parameter $\theta \in \Theta$ $$\theta_{k+1} = \theta_k - \eta_k \frac{\partial e_{mse}}{\partial \theta}$$

Where $\eta_k$ is the learning rate

Truncate all parameters to $[1, -1]$ mitigating the chance of numerical instabilities Update the learning rate, e.g., $$\eta_k = \frac{\eta_0}{k}$$

where k is the sweep number, and $\eta_D$ is the initial training rate meta parameter which may be optimized (TBD)

Replace the current model with the new model for the next sweep

Repeat all steps until the stopping criteria is fulfilled

Predetermined number of sweeps $N_{bgd}$

Cross validation MSE is small enough

Model smoothing: to smooth the evolving models between two consecutive long-term learning processes we may use the following:

Use the current model as initial values of the new model

Train an intermediate new model $\tilde{\Theta}_{n+1}$, than exponential smooth each parameter $\tilde{\theta}_{n+1} \in \tilde{\Theta}_{n+1}$ to generate the new model $\Theta_{n+1}$ $$\theta_{n+1} = \gamma \tilde{\theta}_{n+1} + (1-\gamma)\theta_n; \gamma \in [0,1]$$

The inter model smoothing meta parameter Y, may be optimized (TBD)

Combine the Previous Two Methods

As an alternative to the exponential smoothing we may use Kalman filter to smooth the model parameters Short-Term Learning Each learning phase covers period of $T_s$ minutes (e.g., 60 minutes) and occur every $T_{st}$ minutes (e.g., 5 minutes)

The interactions are aggregated and scores are calculated

Update all LFVs of pages that were viewed during $T_s$ using the LFVs of their viewers a-la.

$$q_j^{st} = q_j + \frac{1}{\sqrt{N_j}} \sum_{(i,j) \in \Omega} q_i$$

Where $N_j$ is page j number of interactions during $T_s$ $q_j$ is the LFV resulting from the last long-term learning process For new stories set $q_j \equiv 0$ (addressing new stories cold-start issue)

Update all LFVs of users that were active during $T_s$ using the LFVs of stories they viewed a-la.

$$q_i^{st} = q_i + \frac{1}{\sqrt{N_i}} \sum_{(i,j) \in \Omega} q_j$$

Where $N_i$ is user i number of interactions during $T_s$ $q_i$ is the LFV resulting from the last long-term learning process For new users set $q_i \equiv 0$ (addressing new users cold-start issue)

As an alternate embodiment of implementing a short-term learning procedure, a decay is employed in place of moving a window. Accordingly, the users' LFVs may be updated for the n+1 short term learning period as follows $$q^{st}_{i,n+1} = q_i + \tilde{q}^{st}_{i,n+1}; \tilde{q}^{st}_{i,n+1} = \alpha \tilde{q}^{st}_{i,n} + (1-\alpha) \frac{1}{\sqrt{N_i}} \sum_{(i,j) \in \Omega} q_j$$

In an embodiment, LFVs resulting from the short-term learning procedures are not used as the starting point of the next long-term learning procedure.

Figure 16:
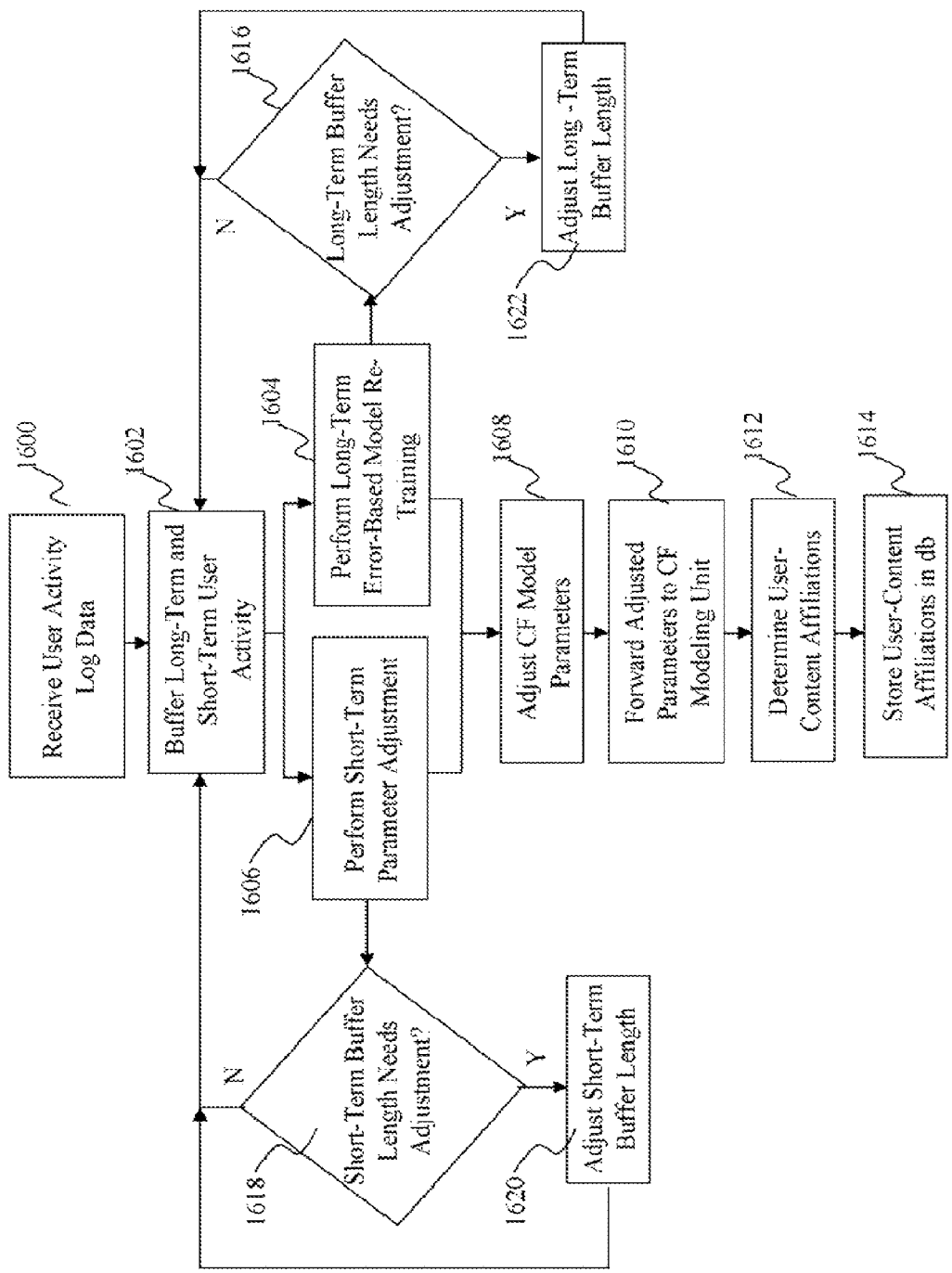
FIG. 16 is a flowchart depicting a method for adjusting model parameters, according to an embodiment of the present teaching.

FIG. 16 depicts an embodiment of a method for adjusting model parameters. In steps 1600-1602, the respective modules of the CF system 1200 described above receive and buffer long-term and short-term user activity data. In steps 1604, 1606, the CF system 1200 performs parallel long-term error-based (e.g., MSE based) model re-training and short-term model parameter adjustment. As a result, the system 1200 adjusts model parameters, such as in accordance with respective short-term and long-term model learning cycles, step 1608. Next, the adjusted modeling parameters are forwarded to the CF modeling unit 1202 for determining the user-content affiliations, steps 1610-1612. In step 1614, the user-content affiliations are stored in a user/content database. Additionally, in connection with short-term parameter adjustment and long-term model re-training steps 1604, 1606, the system 1200 determines whether the respective short or long-term buffer lengths need to be adjusted, for instance when the previous adjustment resulted in a parameter change above or below a predetermined numerical threshold, steps 1616-1618. If buffer length adjustment is needed, the respective buffers are adjusted, steps 1620, 1622. Otherwise, respective short-term and long-term buffering of user activity data continues at current buffer lengths.

Figure 17:
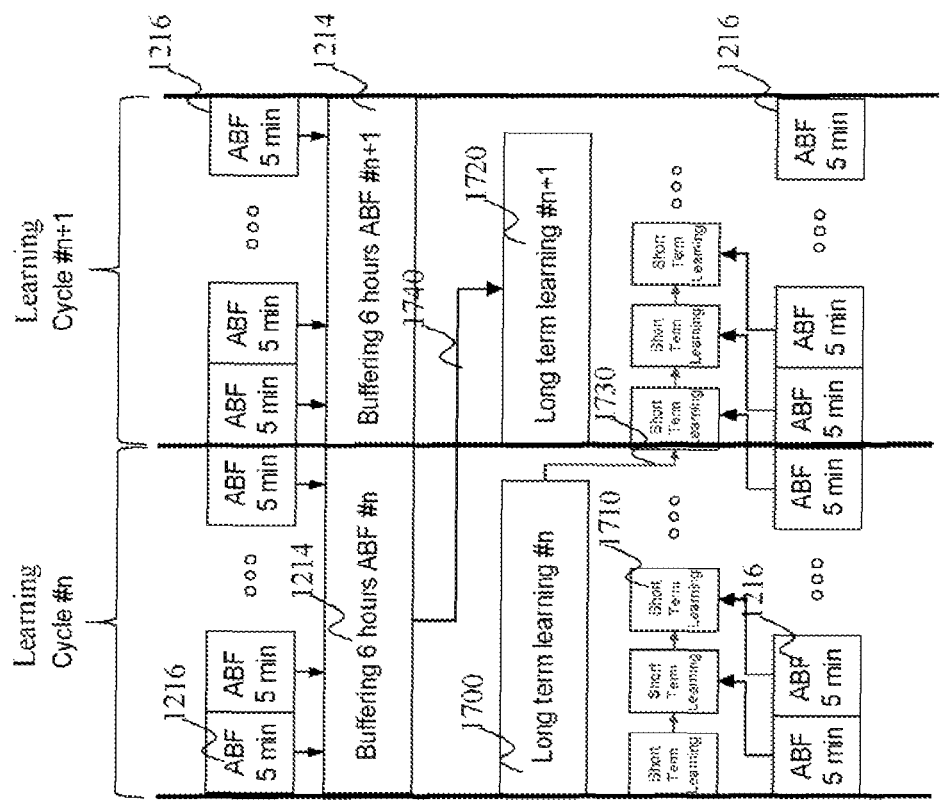
FIG. 17 is a diagram illustrating a short-term and long-term model learning cycles, according to an embodiment of the present teaching.

FIG. 17 depicts an embodiment of a short-term and long-term model learning cycles implemented by the integrated short/long term CF modeling enhancer unit 1212. As shown in FIG. 17, each learning cycle "n" includes a long-term learning cycle 1700 running in parallel with a plurality of short-term learning cycles 1710. Each of the short-term learning cycles is based on the input of small chunks of user activity log data, such as the short term user activity log 1216 buffered in five minute intervals (labeled as "ABF 5 min" in FIG. 17) by the short-term user activity buffering unit 1506. The incoming user activity data is also buffered by the long-term user activity buffering unit 1502 for the duration of the long term user activity log 1214 prior to being applied as in input 1740 to the next long term learning cycle 1720 "n+1." As further shown in FIG. 17, the last retrained model (with corresponding adjusted parameters) output during the previous long-term learning cycle "n" 1700 is used as an input 1730 to the next short term training cycle 1710. Thus, after each long-term learning cycle 1700 during which long-term model learning, including retraining of all model parameters for example, takes place, the retrained model is applied as an input to the next in sequence short-term learning cycle 1710 that updates the model parameters corresponding to the incoming user activity without full model retraining or MSE minimization. Since the short-term learning cycle is brief in duration and does not involve retraining all model parameters via MSE minimization or the like, the short-term model updating takes minimal computing resources and may be run in parallel with a more computation-intensive long-term model learning cycle. The parallel long-term and short-term model learning described above has a further advantage of helping to solve a "cold start" problem for new models and/or new content personalization systems that do not initially have the user activity data at the beginning of operation. For instance, in such scenarios, the short-term learning cycle begins to quickly adjust at least some of the model parameters while the long-term learning cycle is being executed. This further helps to increase the speed of the model parameter learning process. In an embodiment, the above setup allows updating the suggested content served to the user without the need to wait for a full long-term model learning cycle to be completed, for example.

Figure 18:
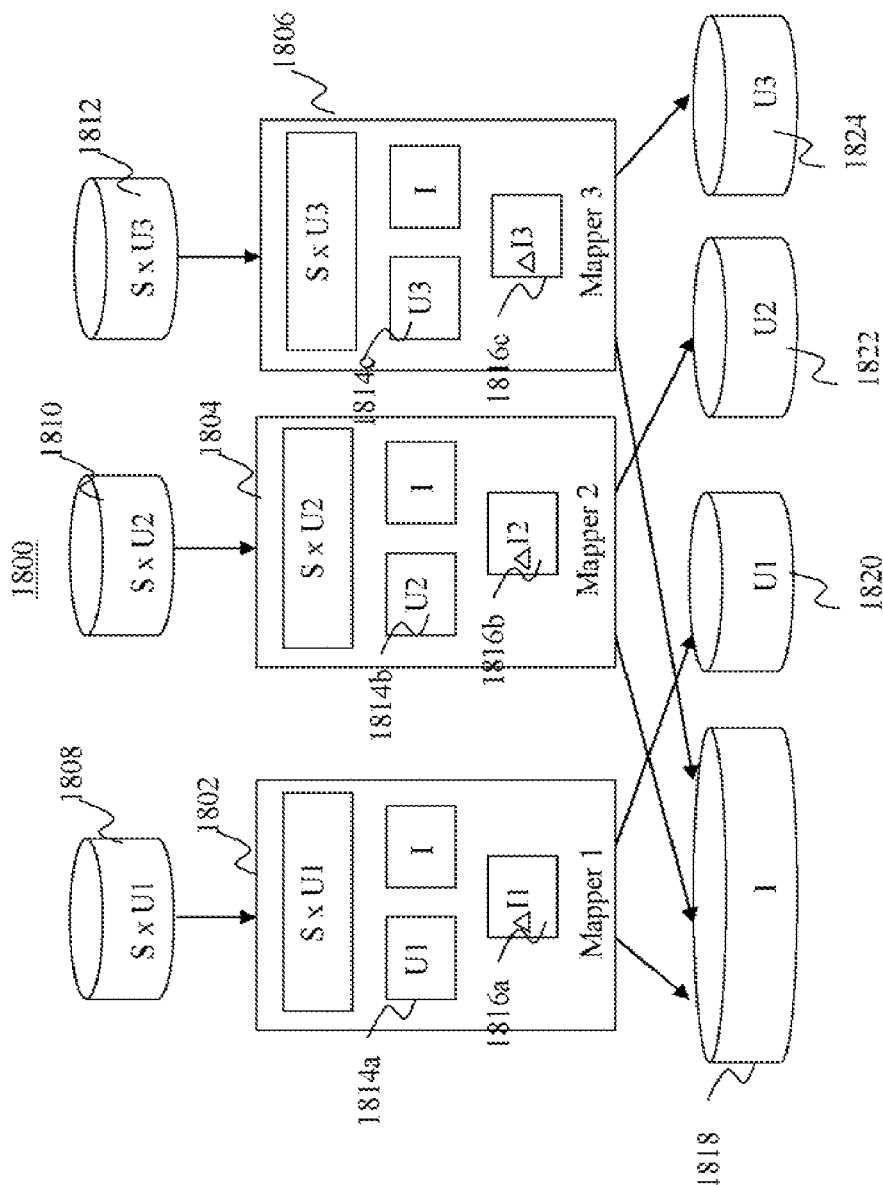
FIG. 18 is a diagram illustrating a CF modeling unit implementing a distributed architecture for asynchronous fault-tolerant matrix factorization utilizing asymmetric input datasets, according to an embodiment of the present teaching.

FIG. 18 illustrates an embodiment of a CF modeling unit 1800 implementing a distributed architecture for asynchronous fault-tolerant matrix factorization utilizing asymmetric input datasets. In particular, FIG. 18 illustrates an embodiment of using a map-reduce (MP) framework for fault-tolerant parallel implementation of Batch Gradient Descent (BGD) type CF model parameter learning apparatus with increased processing efficiency and asynchronous input-output (I/O) characteristics, as further discussed below.

In general, Collaborating filtering (CF) has proved itself in numerous settings to be key technology for content recommendation systems (RecSys). One of the popular approaches of CF RecSys is the matrix factorization (MF) approach. In its basic form, CF-MF model entities (user and item) are presented by vectors of K latent features (usually $10 <= K <= 100$). Typically, the number of users by far exceeds the number of items. The set of vectors (i.e., the model) is learned by minimization of a loss function defined for train events (user-item interactions such as clicks or ratings) and their corresponding estimated values derived by the relevant model vectors (e.g., squared error between the ratings and their estimations given by a dot product between the relevant user and item vectors).

In a standard non-parallel computing environment, the learning process is typically done by an iterative stochastic gradient decent algorithm (SGD). In the standard setting, the SGD computation paradigm requires incrementally updating the user and item vectors with gradient increments for each user-item interaction record. In order for the process to converge, the algorithm scans the entire input (user-item interaction set, S) multiple times, until the changes to the model become small enough.

However, in a large-scale setting, running SGD on a single machine is infeasible, since it is impossible to load the user and item models in the RAM of a single machine. The option of updating a remote (scalable) database upon each processed record is also unattractive, since it entails a massive amount of direct-access I/O. In this context, SGD can be approximated by batch gradient descent (BGD). The algorithm breaks the computation into a series of small batches of user-item interactions. The user and item models are frozen throughout the batch. The computation aggregates the (cumulative) increment, and applies it to the model at the end of the batch. (Thus, SGD can be viewed as an extreme case of BGD with the batch size of 1).

For very large datasets, it is attractive to run BGD in parallel on multiple machines. Popular data processing computing platforms like map-reduce (MR) or Spark can be adapted for this process. For example, MR allows parallel processing of multiple partitions of the original dataset (map), followed by aggregation of the partial cumulative gradients (reduce). In this context, every input partition is a BGD split, and multiple splits are processed independently, based on the user (U) and item (I) models. Therefore, one complete scan of the entire input stands for a single iteration of the matrix factorization (MF) learning algorithm.

However, a straightforward implementation on top of MR (one job per iteration) entails a large performance overhead, for three reasons: (1) the intermediate results of each job are written to a distributed file system, in multiple replicas and (2) the management overhead of a map-reduce job execution, and (3) the job's completion is driven by the slowest task. The execution can be optimized on a distributed machine-learning-oriented platform (e.g., Spark) that (1) spreads the intermediate results in RAM across multiple machines, and (2) performs all computation in a single job. However, this solution is still subject to slow-task bottlenecks, since it synchronizes all the tasks at the end of each iteration. This synchronization is not required for proper functionality.

Embodiments of system and methods described herein provide BGD computation on the MR infrastructure, which reduces the execution latency by orders of magnitude. The algorithm described below exploits the MR framework as a container for reliable distributed execution. It embeds the iterative computation into a single MR job, thus avoiding the overhead described above. The iterated gradient aggregation and write-back happen in the mapper code, and there is no synchronization among the multiple tasks.

We exploit the fact that the number of users significantly exceeds the number of items ($|U|>>|I|$). Therefore, we optimize the processing by partitioning the interaction set S by user id, such that multiple mappers access non-overlapping partitions of U, and share the access to I. The present teaching's core advantage is therefore I/O-efficient isolated update of U combined with inexpensive shared update if I.

To avoid excessive I/O, the write-back to U (private storage) is deferred to the end of the task, whereas the write-back to I (shared storage) happens asynchronously (not necessarily on iteration boundary).

The described embodiments inherit the fault-tolerance built into the MR platform, and exploits the context provided by the infrastructure to overcome the transient failures.

Data Layout

An embodiment of the present teaching maintains a model for a universe of users (U) and a universe of items (I). It is assumed that $|U|>>|I|$.

Both U and I are a set of latent vectors of the same dimension, one for each user and for each item.

U is implemented as sequential file, partitioned by user id.

I is implemented as shared-access key-value store, keyed by item id.

The following embodiments receive as input an interaction set S—a set of <u,i> pairs, each capturing the event of user u consuming item i. S is implemented as partitioned sequential file.

For clarity of presentation, we start with presenting the failure-free case.

Preprocessing: Joins U and S, over the user id key, in a MR job. Co-partition the result set (denoted S×U) with U.

The main MR job has no reduce tasks.

A single mapper task t scans one partition of S×U (task's split) and the whole I (shared file). It stores the scanned data in its local RAM. In an embodiment, the data structures are as follows:

Read-write
U's partition, Ut
I's increment, $\Delta$It.
Read-only
S×U's partition, S×Ut
I's replica, I The task locally performs the BGD iterations until the termination condition is satisfied. No communication with the other tasks happens. Upon convergence, the mapper writes back Ut.

Periodically (and asynchronously from the other tasks), the mapper applies $\Delta$It to I, such as through an atomic increment Application Programming Interface (API) which is present in multiple NoSQL databases. After the increment, it re-scans I, to synchronize with the other task's modifications. The final increment happens upon the task's completion.

As shown in FIG. 18, the user set U is partitioned into multiple sets U1, U2, U3, and so on. The mapper units 1802-1806 execute an embodiment of a BGD in parallel on respective multiple machines or processors. Each mapper unit receives a partitioned set of user (U)—content item (I) interactions 1808-1812 and asynchronously estimates CF model parameters for the item I and one or more users in respective user sets U1, U2, U3.

In an embodiment, the input to each mapper unit is user-item interaction data partitioned for each set of users. For example, mapper unit 1802 receives input of user-item interactions for a set of users U1. The user-item interaction data includes vectors indicating click activity of users accessing certain items of content. Each mapper unit (e.g., a particular machine or processor) asynchronously executes a BGD algorithm only for a corresponding subset of users (e.g., users U1 in case of mapper unit 1802). The mapper units 1802-1806 generate separate latent model parameters for users U and items I. Each user and each item is modeled by a latent vector. Thus, each mapper unit has two outputs: (1) the latent vectors 1814a, 1814b, or 1814c of the users in the respective partition; (2) the contribution $\Delta$I 1816a, 1816b, or 1816c (e.g., an item vector model parameter change) to the shared item model "I" 1818. The contribution $\Delta$I 1814 to the shared item model I 1818 is applied to model multiple times, asynchronously, during the task's execution.

In an embodiment, each mapper unit 1802-1806 asynchronously writes to its respective user data repository 1822-1824 after it is finished modeling all item-user pairs for its respective set of users. Thus, in the foregoing embodiment, the mapper units 1802-1806(a) update the local user model (a matrix Ut, which is written back upon the task's completion), and (b) update the shared item model (also a matrix, I, to is periodically added an increment $\Delta$It). After the update, the task re-scans I to its local cache. The advantage of updating I asynchronously is synchronizing with the partial computation results in the other tasks. This accelerates the model convergence. In an embodiment, the foregoing asynchronous functionality replaces direct message exchange among the tasks and results in a computational performance boost in the context of using the BGD algorithm for CF model parameter learning.

In a further embodiment, the mapper units 1802-1806 provide fault tolerant task execution when a given mapper unit fails by re-running the BGD model parameter learning algorithm. In particular the replacement mapper unit starts updating the model starting from the step at which the failure has happened. This can be achieved by checkpointing the minimal task state in the database, such as by storing the number of times that the I database was updated. Then, the backup task skips these first updates, and proceeds regularly from that point.

Figure 19:
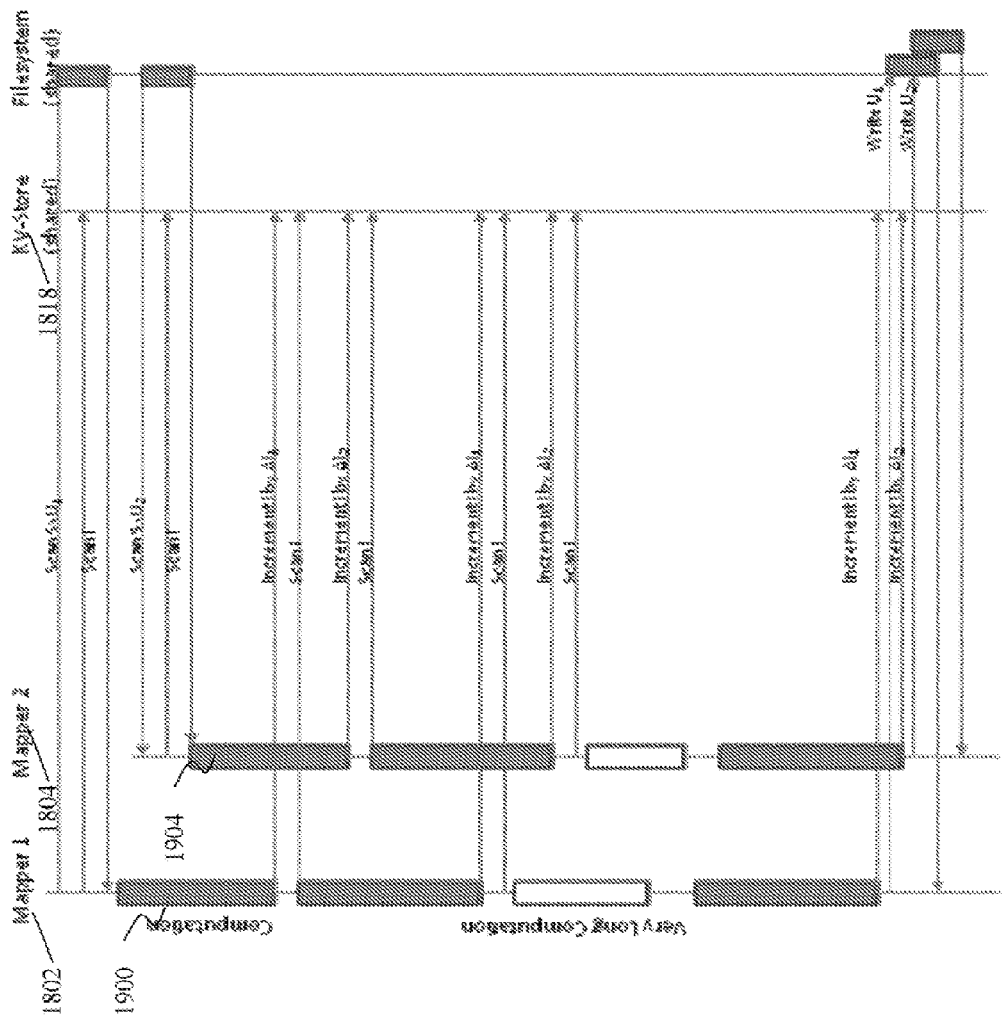
FIG. 19 is a sequence diagram illustrating parallel computing and asynchronous input-output (I/O) of model vector updates, according to an embodiment of the present teaching.

FIG. 19 illustrates an embodiment of parallel computing and asynchronous input-output (I/O) of model vector updates associated with the above embodiment. As illustrated in FIG. 19, the mapper unit 1802 performs a CF model parameter learning computation 1900 (e.g., based on a BGD algorithm), while mapper unit 1804 scans the user-item interaction data at a shared file system and scans the shared key-value (KV) store/database I 1818 for the latest items model parameters. At the end of its computation block 1900, the first mapper unit 1802 increments the shared I database 1818 with an incremental change in items model parameters $\Delta$I1. At this time, the second mapper unit 1804 is continuing its computation block 1904. Each mapper unit writes the updated user model vector parameters U at task completion, such as when a given mapper unit is done modeling all item-user pairs in its set of users. In an embodiment, the updated item (e.g., page) and user model parameters are input to the CF modeling unit 1202 (FIG. 12).

Figure 20:
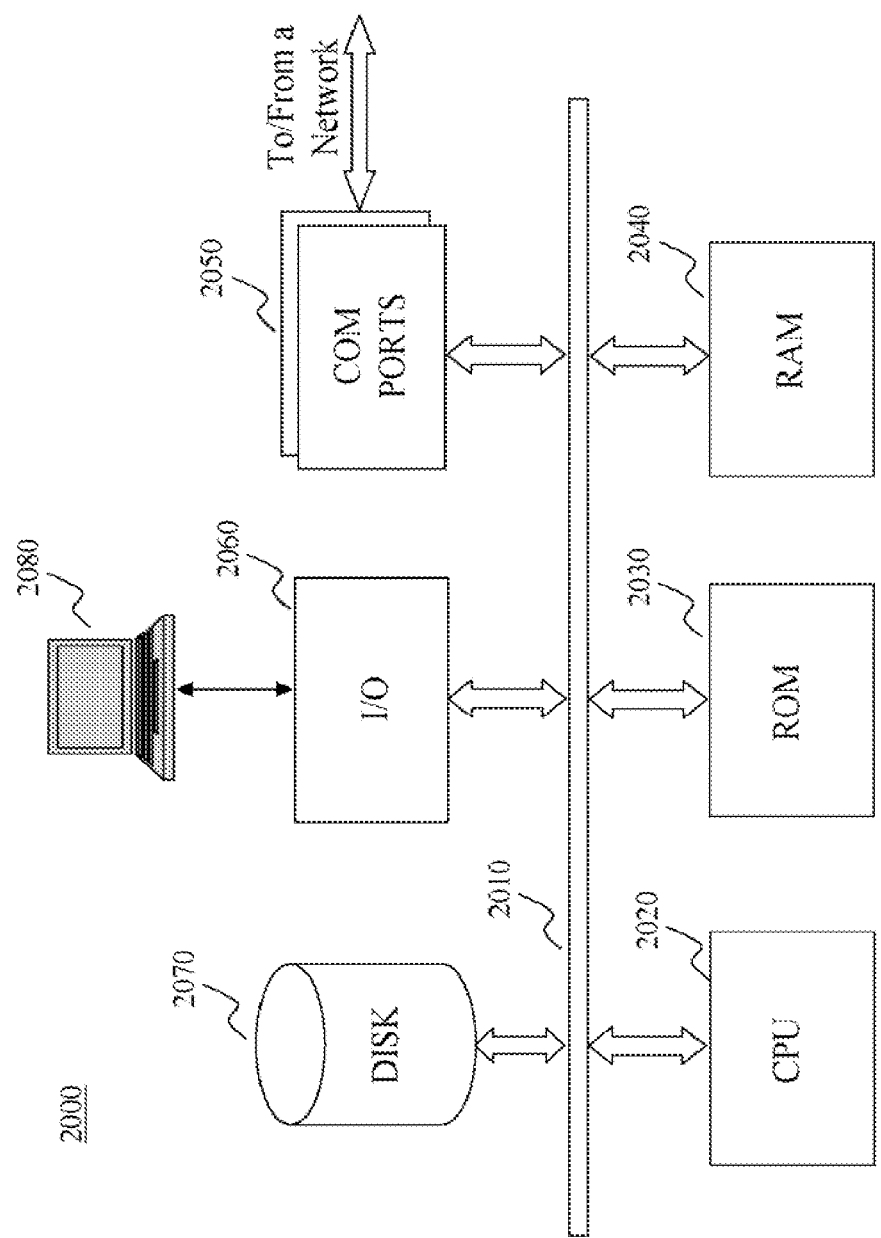
FIG. 20 depicts a general computer architecture on which the present teaching can be implemented.

FIG. 20 depicts a general computer architecture on which the present teaching can be implemented and has a functional block diagram illustration of a computer hardware platform which includes user interface elements. The computer may be a general purpose computer or a special purpose computer. This computer 2000 can be used to implement any components of the user understanding unit 155, collaborative filtering modeling unit 1202, mapper units 1802-1806, as well as any other unit or module described herein, including via hardware, software program, firmware, or a combination thereof. Although only one such computer is shown, for convenience, the computer functions relating to ad modality selection may be implemented in a distributed fashion on a number of similar platforms, to distribute the processing load.

The computer 2000, for example, includes COM ports 2050 connected to and from a network connected thereto to facilitate data communications. The computer 2000 also includes a central processing unit (CPU) 2020, in the form of one or more processors, for executing program instructions. The exemplary computer platform includes an internal communication bus 2010, program storage and data storage of different forms, e.g., disk 2070, read only memory (ROM) 2030, or random access memory (RAM) 2040, for various data files to be processed and/or communicated by the computer, as well as possibly program instructions to be executed by the CPU. The computer 2000 also includes an I/O component 2060, supporting input/output flows between the computer and other components therein such as user interface elements 2080. The computer 2000 may also receive programming and data via network communications.

Hence, at least some aspects of the methods of the methods described herein may be embodied in programming. Program aspects of the technology may be thought of as "products" or "articles of manufacture" typically in the form of executable code and/or associated data that is carried on, embodied in, or physically stored on a type of machine readable medium. Tangible non-transitory "storage" type media include any of all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the ad modality selection server and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a machine having at least one processor, a storage, and a communication platform for adjusting one or more parameters associated with a model, comprising:
obtaining, from a first source, first information related to activity of a user;
adjusting one or more parameters associated with a model based on the first information obtained within a first time period having a first length of time;
obtaining, from a second source, second information related to activity of the user;
adjusting at least the one or more parameters associated with the model based on the second information obtained within a second time period having a second length of time and a measure indicative of performance of the model;
changing the first length of time when the adjustment of the one or more parameters based on the first information exceeds a first threshold; and
changing the second length of time when the adjustment of the at least one or more parameters based on the second information exceeds a second threshold, wherein the model is used to determine an affiliation between the user and content, and the second length of time is larger than the first length of time.

2. The method of claim 1, wherein the second time period overlaps with the first time period.

3. The method of claim 1, wherein the step of adjusting one or more parameters associated with the model based on the first information includes:

performing an incremental update of values of the one or more parameters based on the first information.

4. The method of claim 1, wherein the step of adjusting at least the one or more parameters associated with the model based on the second information includes:

training the model using a collaborative filtering approach based on the second information.

5. The method of claim 1, wherein the affiliation is based on a score computed based on the model and bias with respect to the user and the content.

6. The method of claim 1, wherein the affiliation is based on a score computed based on the model and latent factor vectors with respect to the user and the content.

7. A system having at least one processor for adjusting one or more parameters associated with a model, the system comprising:

a modeling enhancer implemented on the at least one processor and configured to obtain, from a first source, first information related to activity of a user, and obtain, from a second source, second information related to activity of the user;

a first adjuster implemented on the at least one processor and configured to adjust one or more parameters associated with a model based on the first information obtained within a first time period having a first length of time;

a second adjuster implemented on the at least one processor and configured to adjust at least the one or more parameters associated with the model based on the second information obtained within a second time period having a second length of time and a measure indicative of performance of the model;

a short term length adjuster configured to change the first length of time when the adjustment of the one or more parameters based on the first information exceeds a first threshold; and a long term length adjuster configured to change the second length of time when the adjustment of the at least one or more parameters based on the second information exceeds a second threshold, wherein the model is used to determine an affiliation between the user and content, and the second length of time is larger than the first length of time.

8. The system of claim 7, wherein the second time period overlaps with the first time period.

9. The system of claim 7, wherein the first adjuster is further configured to perform an incremental update of values of the one or more parameters based on the first information.

10. The system of claim 7, wherein the second adjuster is further configured to train the model using a collaborative filtering approach based on the second information.

11. The system of claim 7, wherein the affiliation is based on a score computed based on the model and bias with respect to the user and the content.

12. The system of claim 7, wherein the affiliation is based on a score computed based on the model and latent factor vectors with respect to the user and the content.

13. A non-transitory machine readable medium having recorded thereon information for adjusting one or more parameters associated with a model, wherein the information, when read by a computer, causes the machine to perform the steps of:

obtaining, from a first source, first information related to activity of a user;

adjusting one or more parameters associated with a model based on the first information obtained within a first time period having a first length of time;

obtaining, from a second source, second information related to activity of the user;

adjusting at least the one or more parameters associated with the model based on the second information obtained within a second time period having a second length of time and a measure indicative of performance of the model;

changing the first length of time when the adjustment of the one or more parameters based on the first information exceeds a first threshold; and changing the second length of time when the adjustment of the at least one or more parameters based on the second information exceeds a second threshold, wherein the model is used to determine an affiliation between the user and content, and the second length of time is larger than the first length of time.

14. The medium of claim 13, wherein the second time period overlaps with the first time period.

15. The medium of claim 13, wherein the step of adjusting one or more parameters associated with a model based on the first information includes:

performing an incremental update of values of the one or more parameters based on the first information.

16. The medium of claim 13, wherein the step of adjusting at least the one or more parameters associated with the model based on the second information includes:

training the model using a collaborative filtering approach based on the second information.

17. The medium of claim 13, wherein the affiliation is based on a score computed based on the model and bias with respect to the user and the content.

18. The medium of claim 13, wherein the affiliation is based on a score computed based on the model and latent factor vectors with respect to the user and the content.

* * * * *